United States Patent
Tucker

(10) Patent No.: US 9,003,933 B1
(45) Date of Patent: Apr. 14, 2015

(54) LUG NUT TOOL SUPPORT

(71) Applicant: Russell Dalzell Tucker, Meridian, MS (US)

(72) Inventor: Russell Dalzell Tucker, Meridian, MS (US)

( * ) Notice: Subject to any disclaimer, the term of this patent is extended or adjusted under 35 U.S.C. 154(b) by 0 days.

(21) Appl. No.: 14/328,025

(22) Filed: Jul. 10, 2014

(51) Int. Cl.
  *B25B 23/00* (2006.01)
  *B60B 29/00* (2006.01)

(52) U.S. Cl.
  CPC .................... *B60B 29/007* (2013.01)

(58) Field of Classification Search
  CPC ....................................... B25B 23/00
  USPC ............................... 81/462; D8/71
  See application file for complete search history.

(56) References Cited

U.S. PATENT DOCUMENTS

| | | | | |
|---|---|---|---|---|
| 4,619,161 A | * | 10/1986 | Reynolds | 81/462 |
| 4,620,462 A | | 11/1986 | Parker | |
| 5,018,413 A | | 5/1991 | Vazquez | |
| 5,263,392 A | | 11/1993 | Schoen | |
| 5,431,074 A | * | 7/1995 | Durante | 81/462 |
| 5,613,411 A | | 3/1997 | Rines | |
| 5,910,198 A | * | 6/1999 | Maher et al. | 81/462 |
| 5,967,005 A | * | 10/1999 | DeVore et al. | 81/462 |
| 6,041,681 A | * | 3/2000 | Griffin, Sr. | 81/462 |
| 6,662,692 B2 | | 12/2003 | Anderson et al. | |
| 6,748,832 B1 | * | 6/2004 | Maxwell | 81/462 |
| 6,769,333 B2 | | 8/2004 | Keady | |
| 2003/0010161 A1 | * | 1/2003 | Ready | 81/462 |
| 2003/0131696 A1 | * | 7/2003 | Anderson et al. | 81/462 |
| 2006/0042430 A1 | * | 3/2006 | Anderson | 81/462 |
| 2013/0305888 A1 | * | 11/2013 | Robinson et al. | 81/462 |

* cited by examiner

*Primary Examiner* — David B Thomas
(74) *Attorney, Agent, or Firm* — William C. West

(57) ABSTRACT

A hand held device for aligning and supporting a lug nut tool having a socket on one end of an extended arm when rotating lug nuts on a vehicle wheel. The device is a lug nut tool support having a plurality of cylindrical through openings in an elongated main element positioned so that the plurality of cylindrical through openings is generally facing the vehicle wheel, with each opening providing a different elevation to align and support the lug nut tool when rotating the lug nuts during vehicle maintenance operations. An anchoring means may be added to each end of the tool support to reduce the likelihood of the tool support sliding on slippery surfaces. The cylindrical through openings are sized to allow any socket of the lug nut tool to pass through the cylindrical through openings and reduce the likelihood of the tool binding in the tool support.

14 Claims, 23 Drawing Sheets

LUG NUT TOOL SUPPORT

FIELD OF INVENTION

This invention relates to a tool support used to align a lug nut tool with a lug nut on a vehicle wheel, and to provide support for the lug nut tool when rotating the lug nut.

BACKGROUND OF THE INVENTION

This invention is of a lug nut tool support and more particularly to a tool support for the support and alignment of a lug nut tool when removing lugs nuts from a wheel of a vehicle on a variety of surfaces as is explained more fully hereinafter. The present invention is readily usable with a lug nut tool comprising a socket fitting the lug nuts on an extended arm, including the "L" shaped lug nut tool issued with many new vehicles and a standard 4-way lug nut tool found in many auto centers and department stores. Many people have difficulty loosening and tightening lugs nuts when removing or replacing the lug nuts on a wheel when rotating tires or when there has been a flat tire. Since flat tires can occur anywhere from generally level paved parking areas to unlevel surfaces, and on surfaces of varying compositions (e.g., concrete, asphalt, mud, grass, ice), the invention is a single unit hand held device that is compact and designed to be easily employed on varying surfaces and inclines without any additional assembly requirements. The tool support provides stability for the lug nut tool and allows the operator to more safely remove and replace the lug nuts. A second embodiment of the invention has a means of engaging the operational surface, an anchoring means, reducing the likelihood of the tool support sliding on slippery surfaces. This invention is a lug nut tool support with numerous cylindrical through openings at varying heights that provide a means to align an arm of the lug nut tool having a socket compatible with a lug nut being removed and provide a support surface when applying the torque to manipulate the lug nut tool. A number of prior art devices demonstrate the need for support of lug nut tools when applying torque to rotate the lug nut. U.S. Pat. No. 6,662,692B2 presents a lug wrench support with a sliding panel having apertures configured in the lug nut pattern of the wheel and two legs with a small footprint contacting an operational surface, such as the ground. The invention requires some manipulation and preassembly of pins to hold the panel at the required height. Additionally, when the lug wrench (i.e. lug nut tool) is positioned and a force applied to turn the lug nuts, the smaller surface area contacting the operational surface by the two legs will transmit a greater force per square inch to the operational surface than a larger surface area provided by the present invention. This greater force per square inch will result in a greater likelihood that lug wrench support will unintentionally sink into soft surfaces. Additionally, the small surface area of each leg contacting the operational surface increases the likelihood that the lug wrench support will cant on pitted surfaces, making the pattern of apertures difficult to align with the vehicle wheel lug nuts. The present invention provides an elongated larger surface area contacting the operational surface that will bridge across small pits and irregular areas, and reduce the pressure on softer surfaces providing increased stability. Also, the plurality of apertures of U.S. Pat. No. 6,662,692B2 that provide bearing support for the lug nut tool is in a pattern designed for the particular lug nut configuration of the vehicle wheels. When the lug nuts on the wheel are not oriented correctly to align with the pattern on the tool support, the wheel must be rotated to the correct position for the lug nut arrangement on the vehicle wheel to fit the pattern. The wheel will then most likely have to be held stationary to prevent the wheel from turning while rotating the lug nut. Depending on the method used to hold the wheel in a stationary position, the tool support panel may require another adjustment. The present invention requires no mechanical adjustments or preassembly due to numerous cylindrical through openings at varying heights. The best cylindrical through opening to support the lug nut tool's rotation of a particular lug nut is readily apparent after positioning the present invention so that the cylindrical through openings are facing the wheel. U.S. Pat. Nos. 4,620,462, 4,625,600, 5,018, 413, 5,263,392, 5,613,411, and 6,769,333B2 are additional examples of lug nut tool support devices. The present invention provides one or more advantages over each of these inventions. U.S. Pat. No. 5,018,413, U.S. Pat. No. 5,613,411, and U.S. Pat. No. 4,620,462 are not usable with an "L" shaped lug nut tool issued with most autos. U.S. Pat. No. 5,018,413, U.S. Pat. No. 4,625,600, and U.S. Pat. No. 5,263,392 may be difficult to align on unlevel or sloping terrain. The lug nut tool in U.S. Pat. No. 5,018,413, U.S. Pat. No. 4,620,462, and U.S. Pat. No. 4,625,600 may be subject to binding in the support on uneven or sloping terrain. The inventions described in U.S. Pat. Nos. 5,018,413 and 4,620,462 are likely more difficult to store in a vehicle than the present invention. U.S. Pat. No. 6,769,333B2, U.S. Pat. No. 4,625,600, and U.S. Pat. No. 5,263,392 may allow the lug nut tool to slip out of the tool support slot when applying torques to rotate the lug nut. U.S. Pat. No. 5,613,411 and U.S. Pat. No. 5,263,392 require some pre-assembly and a mechanical adjustment for each lug nut. The second embodiment of the present invention with an anchoring means reduces the likelihood of sliding on slippery surfaces. U.S. Pat. No. 5,018,413, U.S. Pat. No. 4,620,462, U.S. Pat. No. 6,769,333B2, and U.S. Pat. No. 4,625,600 make no provisions for slippery surfaces.

SUMMARY

This invention is a tool support having an elongated main element with a plurality of cylindrical through openings. The plurality of cylindrical through openings is generally facing a wheel when the tool support is positioned during operational use on an operational surface such as the ground. The main element includes a first portion, a mid portion, and a second portion with the mid portion located between the first portion and the second portion. The mid portion comprises the plurality of cylindrical through openings with the cylindrical through openings in vertically stacked columns and generally horizontal when the main element of the support is vertically oriented. The tool support is adapted to be positioned with the plurality of cylindrical through openings generally facing a wheel of a vehicle with one end held in place by an individual's hand and the other end placed on the operational surface. The first portion has an access opening that is utilized as a hand grip to hold the tool support in the generally vertical position facing the wheel having the lug nuts to be removed when the second portion is adjacent to the operational surface. Alternatively, the second portion has an access opening that is used as a hand grip when the tool support is inverted and the first portion is adjacent to the operational surface. With one hand wrapped around the first portion end and the fingers of the hand placed in the first access opening, using the opening as hand grip, the tool support is held in position with the cylindrical through openings of the mid portion facing the wheel. For this orientation, the cylindrical through openings provide a first set of supporting surface heights that provide a means to align a lug nut tool having a socket on an extended arm with the lug nut being rotated, and the cylindrical through openings also provide a means to support the lug nut tool while applying torque to rotate the lug nut. For example, when an "L" shaped lug nut tool having a single socket is used, the socket end of the lug nut tool is passed through the tool support cylindrical through opening located along the mid portion of the main element at the best height to place the socket on the lug nut, and support the socket arm during rotation of the lug nut. The hand not holding and controlling the tool support is then used to apply pressure to the arm of the lug nut tool without the socket on the lug nut, rotating the lug nut. When a standard 4 way type of lug nut tool having several sockets is utilized, one of the conventional sockets of the lug nut tool is positioned about one of the lug nuts and the socket on the opposite extending arm is passed through the cylindrical through opening of the mid portion of the main element at the preferable height. The hand not holding the tool support is used to apply pressure to either arm of the lug nut tool perpendicular to the arm having the socket on the lug nut, providing the necessary torque to rotate the lug nut. In cases where the lug nut is difficult to rotate (e.g., rust welding the lug nut on the wheel lug), additional torque can be obtained by using a foot instead of the hand to apply pressure to one arm of the tool perpendicular to the arm with the socket on the lug nut, turning the lug nut. A key feature of the invention is that the plurality of cylindrical through openings, as a group, is not centered with respect to the longitudinal axis of the tool support. This feature allows a second set of available cylindrical through opening supporting surface heights for the lug nut tool to be obtained by flipping the tool support so that the end originally held by the individual's hand is now adjacent to the operational surface. When compared to the first situation when the first access opening was used to hold the tool support, the hand is now wrapped around the second portion and the second access opening is used as a hand grip to hold the tool support in position with the cylindrical through openings of the mid portion facing the wheel providing the second set of cylindrical through opening supporting surface heights equal to the number of the first set of supporting surface heights. Additionally, the tool support can be canted in toward the vehicle wheel, away from the vehicle wheel, to the left, or to the right for minor alignment adjustments to achieve the preferable alignment and operating height for the arm of the lug nut tool with the socket attached to the lug nut being rotated. The ability to cant the tool support and having the diameter of cylindrical through openings much greater than the diameter of the arms of the lug nut tool reduce the likelihood that the lug nut tool will bind in the tool support while attempting to rotate the lug nut. A second embodiment of the invention includes a first portion anchoring means that is added to the first portion and a second portion anchoring means added to the second portion to reduce the likelihood of the tool support slipping when the tool support is expected to be used on icy or slippery operational surfaces. Additionally, the second embodiment includes first cap and a second cap added to the first portion and the second portion, respectively, providing a barrier (i.e. wearing surface) between the edges of those portions that would have contacted the operational surface without the caps when the present invention is placed in an operational state.

OBJECT OF THE INVENTION

It is the object of this invention to provide a tool support of the type described herein which is a flat one piece assembly that is simple to use, inexpensive to manufacture, requires no pre-assembly, is compact, is easily carried and stored in a vehicle, is readily available to assist in removing and replacing lug nuts from a wheel of a vehicle, and is easily transferrable to a new vehicle. The tool support is used with a lug nut tool having an extended arm with a socket on at least one end of the arm compatible with the lug nut being rotated. Examples of such lug nut tools include but are not limited to an "L" shaped lug nut tool that is supplied with many new vehicles, and a standard size 4 way lug nut tool available at most auto parts stores. The plurality of cylindrical through openings with each cylindrical through opening at a different elevation (i.e., operating height) allows for the quick alignment of the lug nut tool arm having the socket compatible with the lug nut being removed, and the cylindrical through openings also provide a means to support the lug nut tools while rotating the lug nut. The tool support is easily used on unlevel terrain and a second embodiment of the invention includes an anchoring means added to each end that is likely to contact the operational surface reducing the likelihood of the tool support slipping on icy or other slippery surfaces.

BRIEF DESCRIPTION OF THE DRAWINGS

These and other features, aspects, and advantages of the present invention will become better understood with regard to the following description, appended claims, and accompanying drawings where:

DESCRIPTION

Figure 1A:
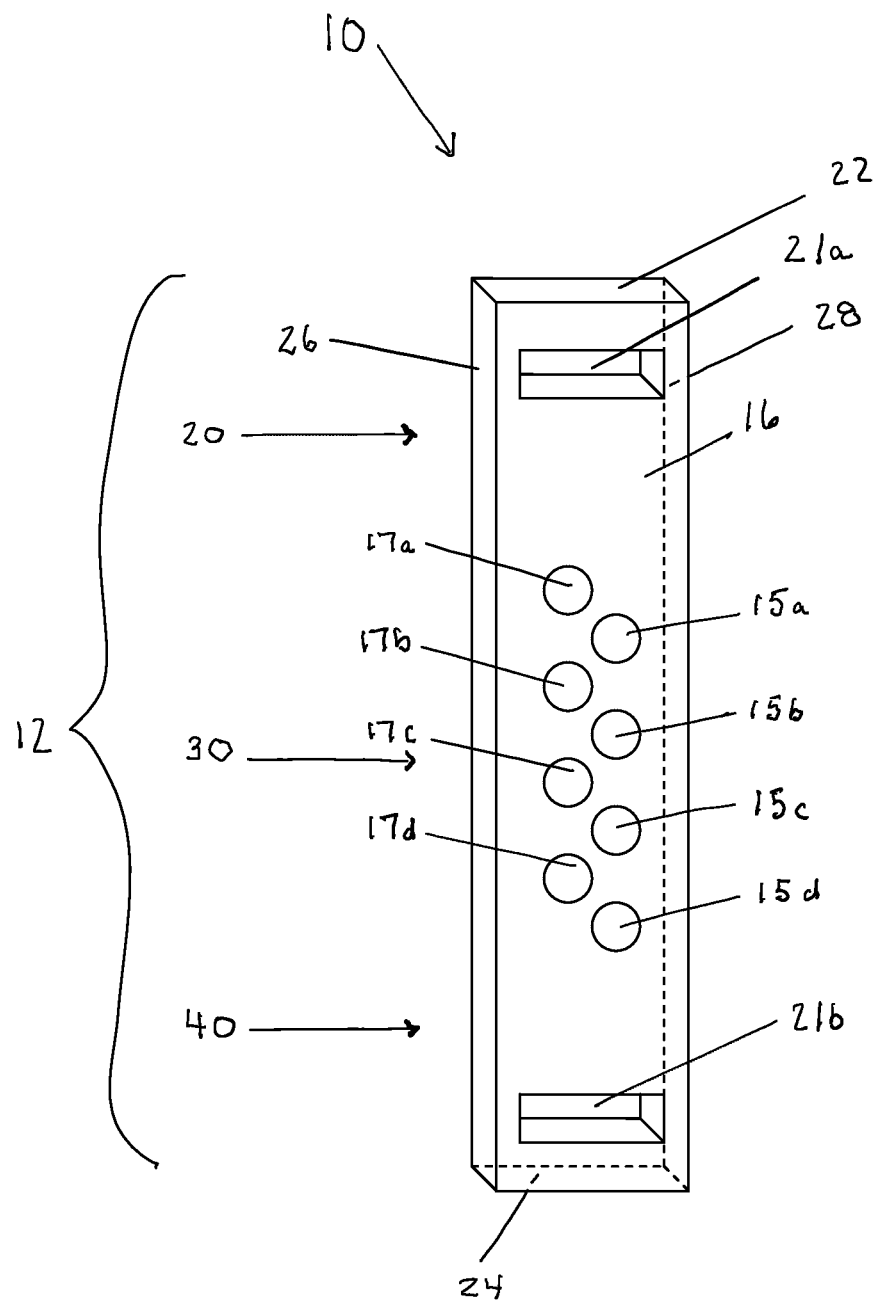
FIG. 1a shows a first embodiment of the invention from a perspective view of the first side surface view of the tool support
Figure 1B:
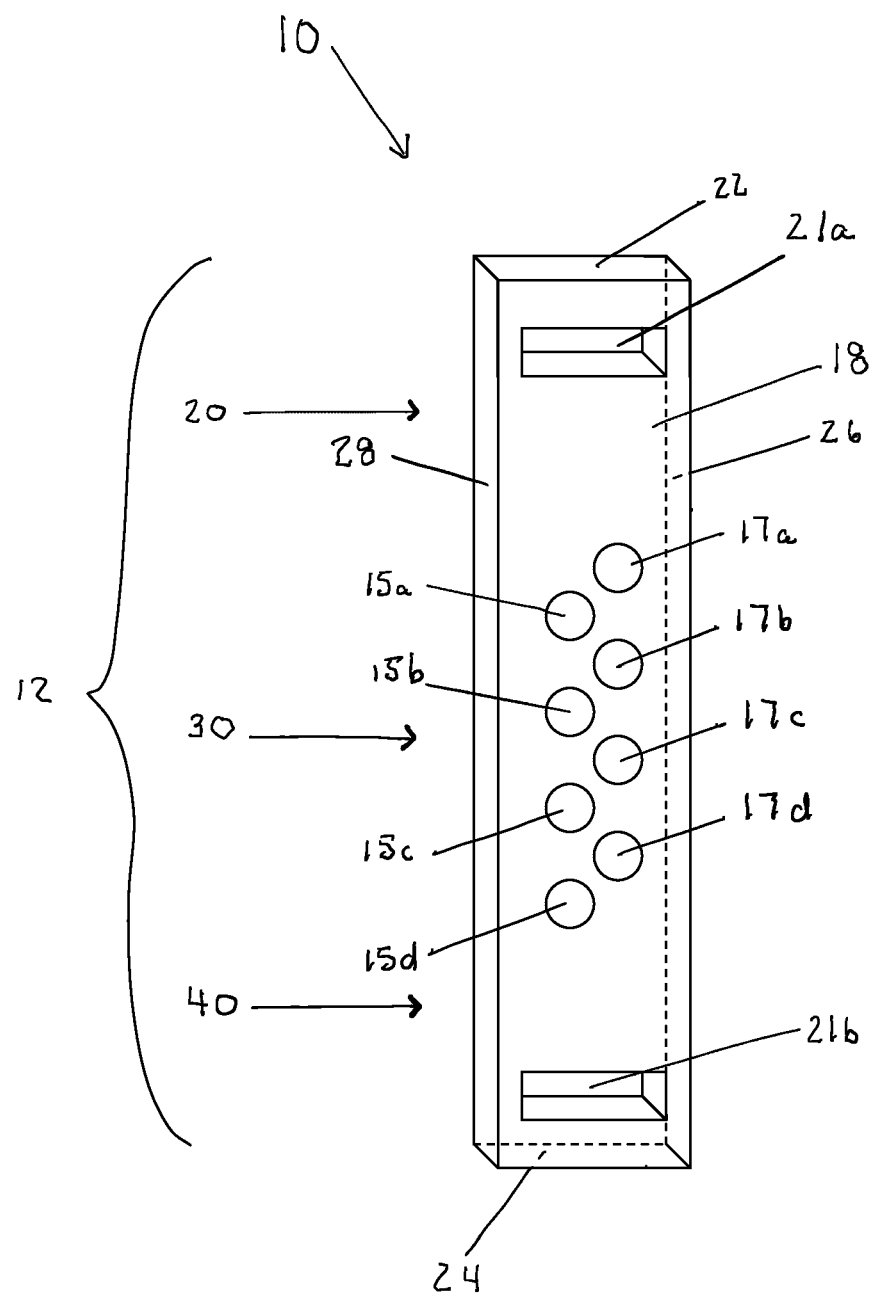
FIG. 1b shows the first embodiment of the invention from a perspective view of the second side surface of the tool support

Looking at the drawings, and more particularly FIGS. 1a and 1b, it is seen that a first embodiment of the invention, a lug nut tool support, generally designated by the numeral 10, is an elongated main element 12 having a plurality of cylindrical through openings, such as cylindrical through opening 15a, with each cylindrical through opening being generally horizontal when tool support 10 is in a generally vertical position. Looking at FIG. 1a, FIG. 1b, and more particularly FIG. 2a, the plurality of cylindrical through openings, such as cylindrical through opening 15a, provide openings from a first side surface 16 to a second side surface 18 of main element 12. Looking at FIGS. 1a and 2a, the tool support 10 is adapted to be positioned using an individual's first hand H1 that is placed in an elongated first access opening 21a to position the plurality of cylindrical through openings, such as cylindrical through opening 15a, in a facing (i.e., confronting) relation to a wheel W. A plurality of lug nuts, such as lug nut N, commonly utilized to hold the wheel W on the vehicle may be removed using an "L" shaped lug nut tool L having a first arm A1 and a second arm A2. The first arm A1 having a lug socket, such as socket S, that fits the lug nut N is passed through a cylindrical through opening, such as cylindrical through opening 15a, and placed on the lug nut N with the cylindrical through opening 15a used as a bearing means to support the lug nut tool first arm A1. Using a second hand H2, the second arm A2 is then used to apply torque and rotate the lug nut N. Looking at FIG. 2b, the lug nut N may also be rotated by a standard 4 way lug nut tool C that includes four radially extending arms with at least one arm, such as first arm AC1, having a socket, such as the socket SC1, that fits the lug nut N. The cylindrical through opening 15a acts a means to support a second arm AC2 aligned with the lug nut tool first arm AC1 and the lug nut N on which the socket SC1 is placed. An arm perpendicular to AC1, such as the third arm AC3, is then used to apply torque to rotate the socket SC1 turning the lug nut N.

Figure 2A:
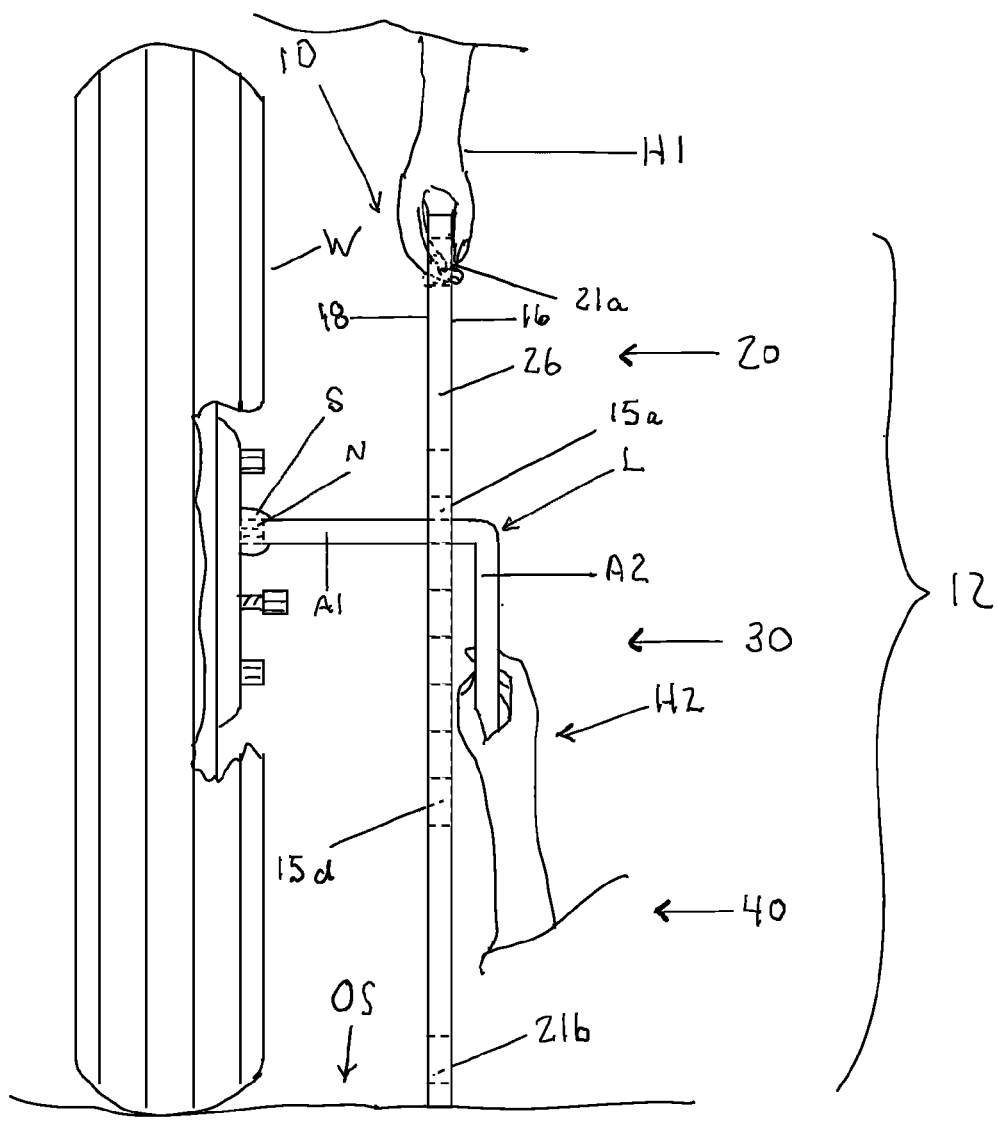
FIG. 2a shows the first embodiment of the invention from a third edge view when an "L" shaped lug nut tool is removing a lug nut from a wheel
Figure 2B:
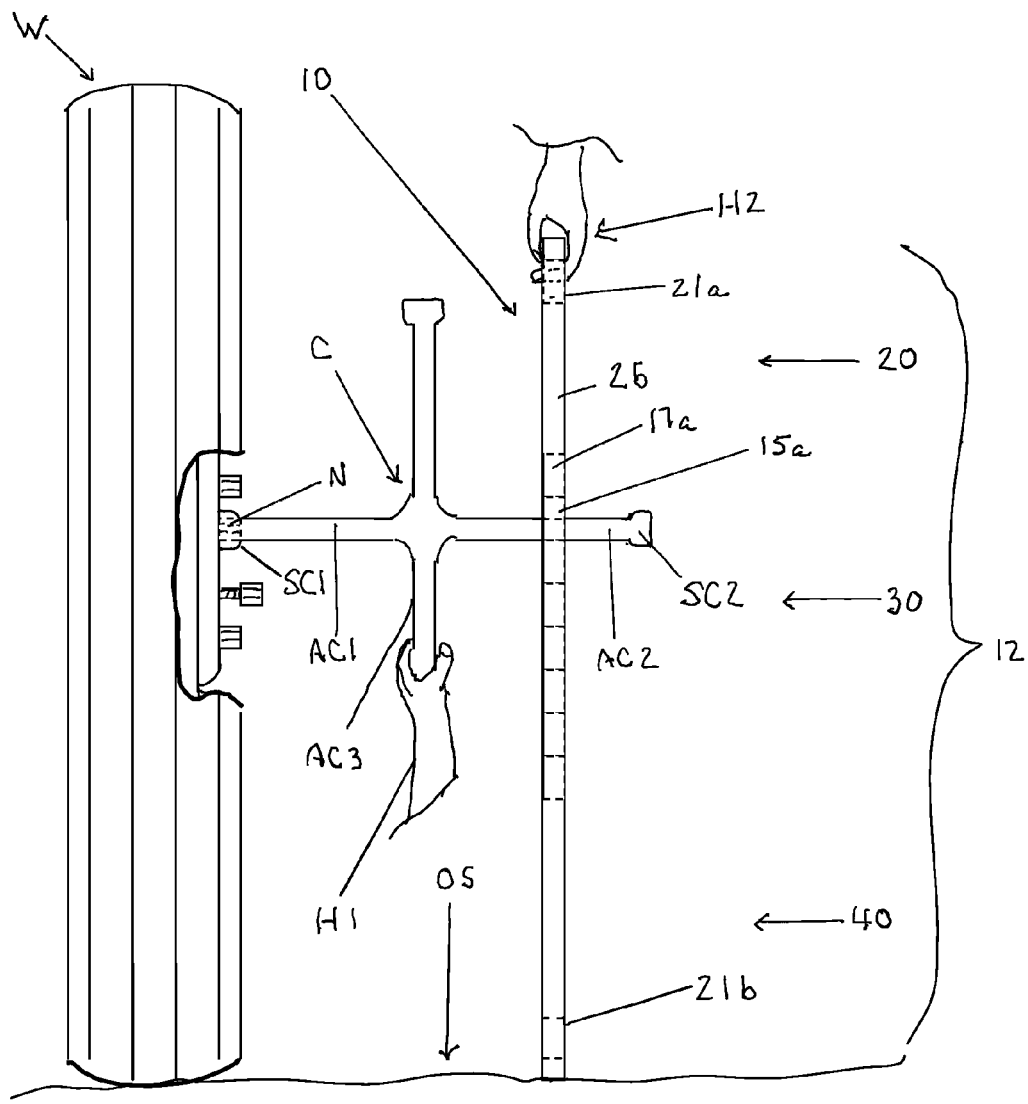
FIG. 2b shows the first embodiment of the invention from the third edge view when a standard 4 way lug nut tool is removing a lug nut from a wheel
Figure 2C:
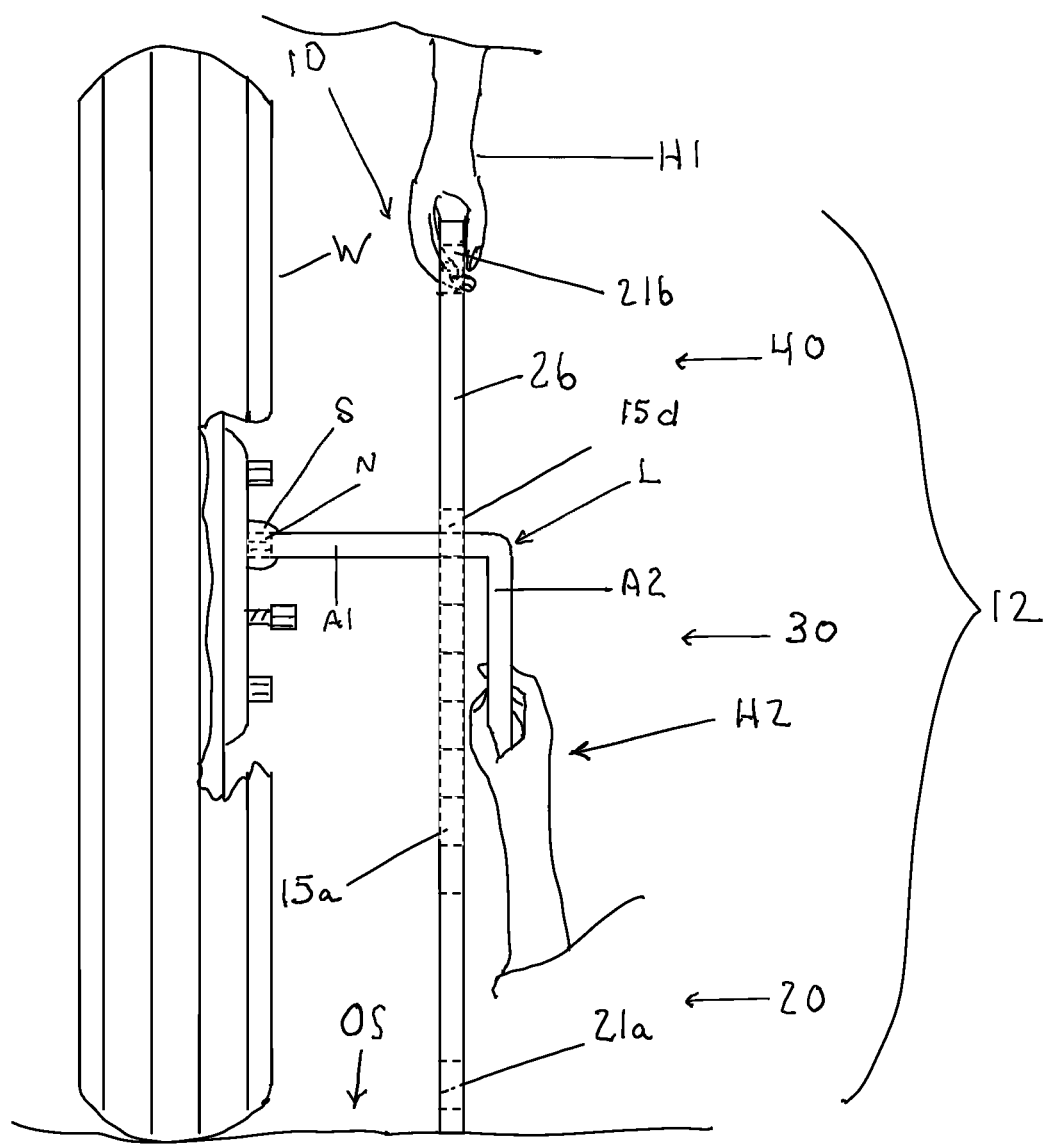
FIG. 2c shows the first embodiment of the invention from an inverted third edge view with the first edge adjacent the operational surface

The plurality of cylindrical through openings, such as cylindrical through opening 15a shown in FIGS. 1a, 2a and 2b, provides a first set of surface heights to align and support the "L" shaped lug nut tool L and the standard 4 way lug nut tool C when the lug nut N is being rotated. An essential feature of the invention is the ability to obtain a second set of surfaces heights by inverting the tool support 10 as shown in FIG. 2c. Using a second access opening 21b as a hand grip to hold the tool support 10 so that the plurality of cylindrical through openings, such as cylindrical through openings 15d, is confronting the wheel W, and the first portion 20 is adjacent to the operation surface OS, a second set of cylindrical through opening surface heights is provided by the plurality of cylindrical through openings, such as cylindrical through opening 15d. The second set of cylindrical surface cylindrical through opening surface heights differs from the first set by a predetermined incremental value, the difference in the height of the first portion 20 and the height of second portion 40 as measured along the longitudinal axis of main element 12. Looking at FIG. 2c, the cylindrical through opening farthest from the operational surface OS, cylindrical through opening 15d, is now best positioned to support removing the lug nut as compared to the operational situation presented in FIG. 2a using the second farthest cylindrical through opening from the operational surface OS, cylindrical through opening 15a.

Looking at FIGS. 1a, and 1b, main element 12 comprises a first portion 20, a mid portion 30, and a second portion 40. The main element 12 has a first edge 22, a second edge 24, a third edge 26, a fourth edge 28, the first side surface 16 and the second side surface 18. The mid portion 30 has the plurality of cylindrical through openings, such as cylindrical through opening 15a, each having the same diameter, and stacked vertically in a plurality of columns, with each column staggered as compared to any other column of cylindrical through openings, such as 17a. Although many configurations of cylindrical through opening are possible, the preferable and predetermined cylindrical through opening configuration is shown in FIG. 1a with each cylindrical through opening, such as cylindrical through opening 15a, having the same diameter, preferably a diameter of 1.5 inches. For the tool support shown in FIG. 1a, there are two columns, a first column containing the cylindrical through openings 15a, 15b, 15c and 15d, and the second column containing the cylindrical through openings 17a, 17b, 17c, and 17d. The cylindrical through openings in one column, such as cylindrical through opening 15a in the first column, are staggered with the cylindrical through openings of any other column, such as 17a in the second column. This staggered columns effect ensures each cylindrical through opening has a different operating height for the alignment of the lug nut tool with the lug nut, and provides a means to support the lug nut tool when rotating the lug nut. For example, the center of the first cylindrical through opening of the first column, cylindrical through opening 15a, is one predetermined cylindrical through opening spacing value, preferably one cylindrical through opening diameter, below the center of the first cylindrical through opening of the second column, cylindrical through opening 17a, as measured relative to the longitudinal axis of main element 12. The cylindrical through openings, such as cylindrical through opening 15a in the first column, and the cylindrical through openings in the second column, such as cylindrical through opening 17a, are vertically spaced the one cylindrical through opening diameter apart from other cylindrical through openings in the same column. For example, the cylindrical through opening 15b is one cylindrical through opening diameter below the cylindrical through opening 15a in the first column, and the cylindrical through opening 17b is one cylindrical through opening diameter below the cylindrical through opening 17a in the second column. Additionally, the cylindrical through openings in each column, such as cylindrical through opening 15a in the first column, are a predetermined incremental column spacing, preferably ¼ inch, from the nearest cylindrical through openings in the adjacent column, such as the second column cylindrical through openings 17a and 17b. Each cylindrical through opening, such as cylindrical through opening 15a, is sized to enable the socket on an extended arm, such as the socket of the "L" shaped lug nut tool and any one of the sockets of the standard 4-way lug nut tool, to be passed through the cylindrical through opening, such as cylindrical through opening 15a. Looking at FIG. 1a, first portion 20 has the first access opening 21a and the second portion 40 has the second access opening 21b. Looking at FIG. 2a, the first access opening 21a is used as a hand grip to hold the tool support 10 in a generally vertical position with the plurality of cylindrical through openings, such as cylindrical through opening 15a, generally facing the vehicle wheel having the lug nuts being rotated, and with the second portion 40 adjacent to the operational surface. Looking at FIG. 2c, the second access opening 21b is used as a hand grip to hold tool support 10 when the first portion 20 is adjacent to the operational surface OS. The first access opening 21a and the second access opening 21b are elongated through openings providing an opening from the first side surface 16 to the second side surface 18. The first and second access openings, 21a and 21b, respectively, are sized to allow an individual's hand to use the openings as a hand grip. For example, by placing the first hand H1 around first portion 20 with the fingers through the first access opening 21a as shown in FIG. 2a, the tool support 10 is held in a generally vertical position with the plurality of cylindrical through openings, such as cylindrical through opening 15a, generally facing the vehicle wheel W. Similarly, looking a FIG. 2c, the second access opening 21b allows an individual to use the access opening 21b as a hand grip by placing the hand H1 around second portion 40 with the fingers through the second access opening 21b.

Looking again at FIGS. 1a, and 1b, the first access opening 21a and second access opening 21b are centered between the third edge 26 and the fourth edge 28, and looking at FIG. 2a, provides a through opening from the first side surface 16 to the second side surface 18. Looking at FIGS. 2a and 2c, the first access openings 21a and the second access opening 21b are sized and located in the first portion 20 and the second portion 40, respectively, to allow an individual's hand to hold the tool support in the vertical position with the plurality of cylindrical through openings, such as cylindrical through opening 15a, confronting the wheel, and the second portion 40 and the first portion 20, respectively, adjacent to the operational surface OS. The first access openings 21a and the second access opening 21b are elongated through openings having a predetermined access opening configuration with a length between ½ and ¾, preferably ⅝, the width of the tool support as measured traverse to the longitudinal axis from third edge 26 to the fourth edge 28, and with the first access opening 21a and the second access opening 21b having a height as measured along the longitudinal axis of the main element 12 between 1 to 3.25 inches, preferably 2 inches. First access opening 21a and the second access opening 21b are positioned at predetermined access opening locations with first access opening 21a and the second access opening 21b being 1-3 inches from the first edge 22 and the second edge 24, respectively, preferably 1.5 inches.

Looking at FIG. 1a, the mid portion 30 runs from a first plane that is perpendicular to the longitudinal axis of main element 12, with the first plane located ¼ inch above the cylindrical through opening closest to the first portion 20, such as the cylindrical through opening 17a, to a second plane that is perpendicular to the longitudinal axis of main element 12 and is located ¼ inch below the cylindrical through opening 15d that is closest to the second portion 40. The height of the first portion 20 and the height of second portion 40, as measured along the longitudinal axis of main element 12, from the mid portion to the first edge 26 and the second edge 28, respectively, vary by the predetermined incremental value that is between one tenth and nine tenths of the radius of one of the cylindrical through openings, such as 15a, preferably ⅙ the radius.

Figure 3A:
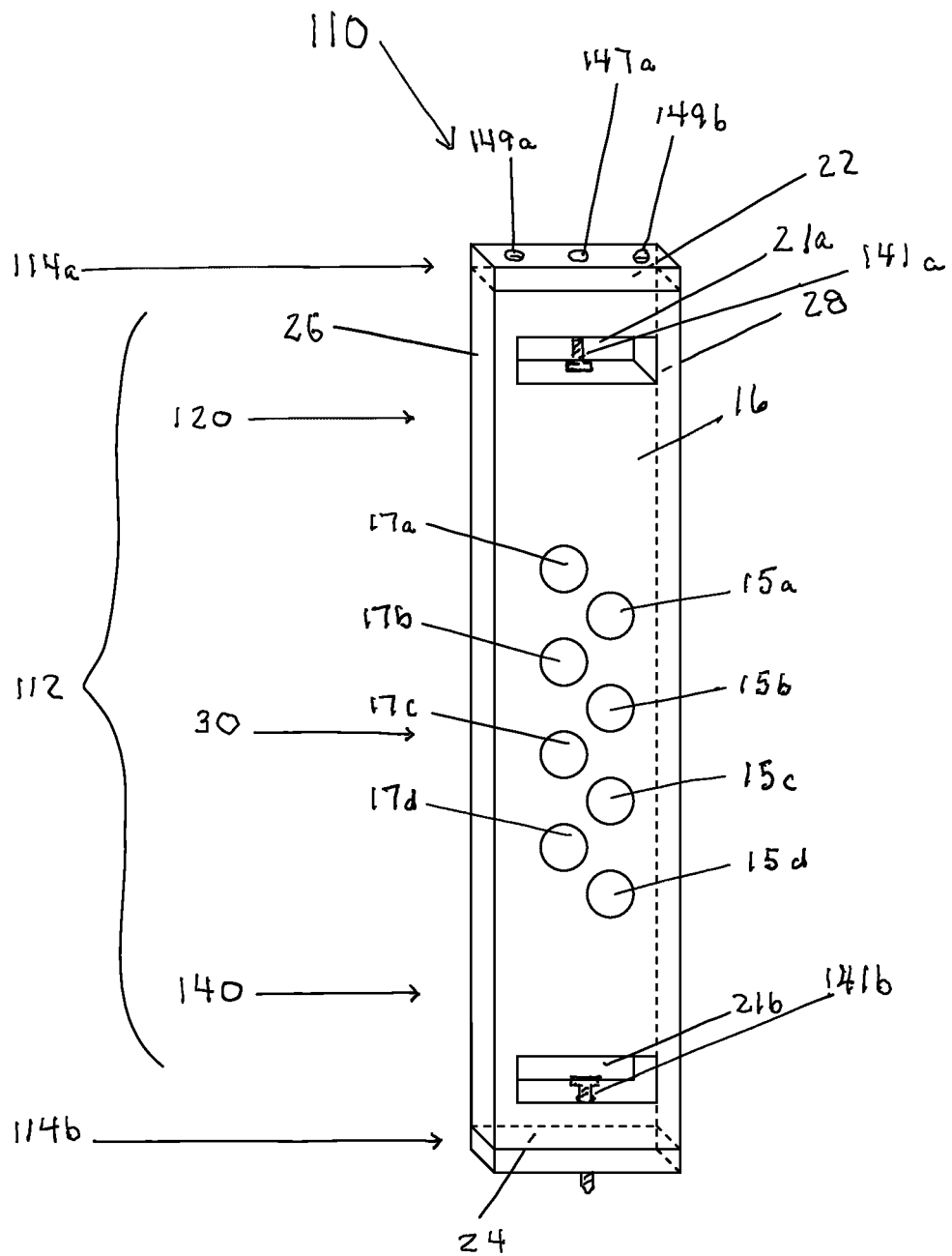
FIG. 3a shows a second embodiment of the invention from a perspective view of the first side surface view of the tool support with a first foot bolt, a second foot bolt, a first cap and a second cap
Figure 3B:
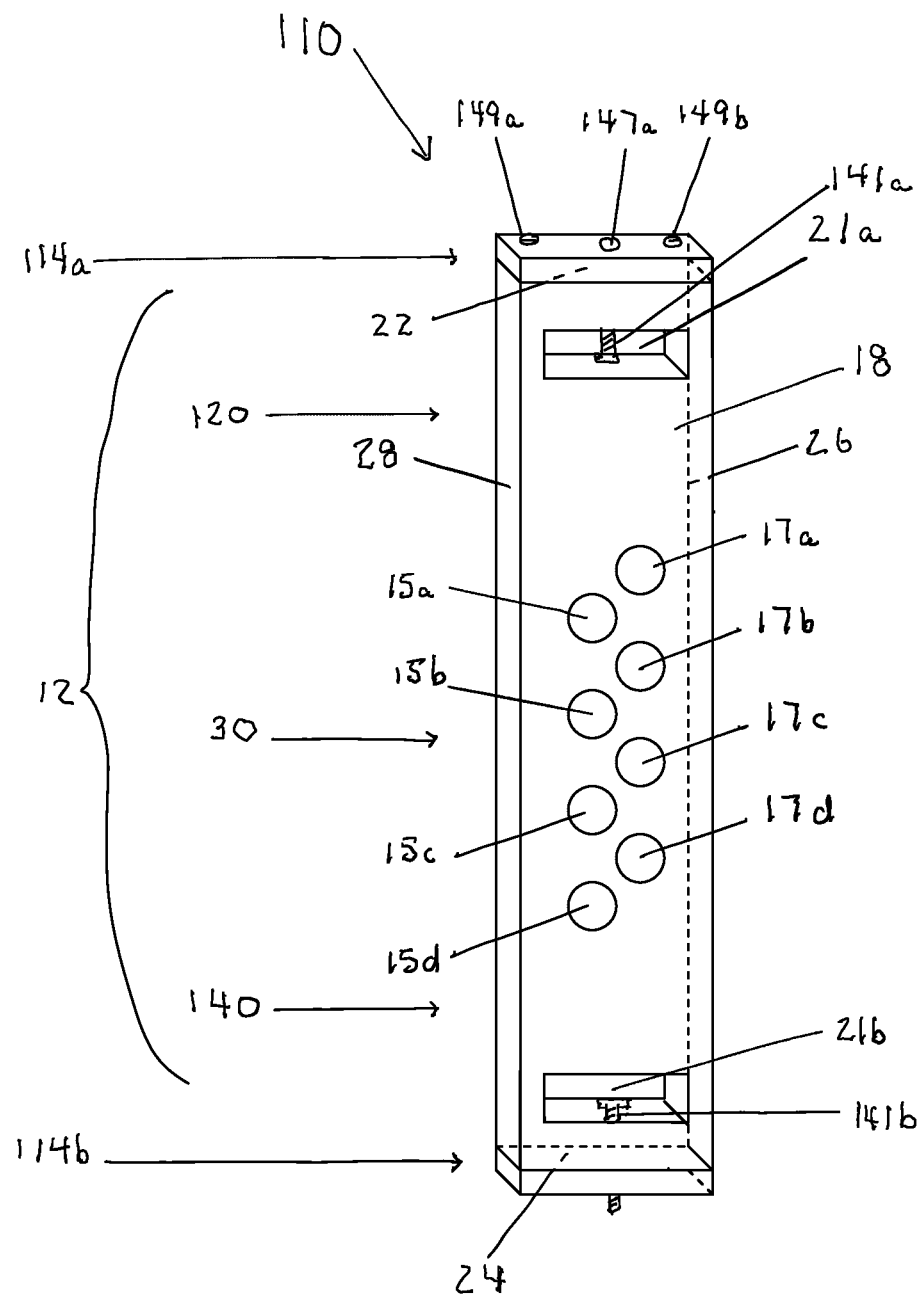
FIG. 3b shows the second embodiment of the invention from a perspective view of the second side surface with the first foot bolt, the second foot bolt, the first cap and the second cap

A second embodiment of the invention 110 as shown in FIGS. 3a and 3b, is created by capping the first edge 22 and the second edge 24 of main element 12 of the first embodiment of the invention 10 shown in FIGS. 1a and 1b with a first cap 114a and a second cap 114b, respectively, and by adding at least one predetermined anchoring means to the first portion 20 forming a new first portion 120, with the anchoring means having a pointed end to engage the operational surface and an engaging element to engage and disengage the pointed end with the operational surface, and at least one predetermined anchoring means to the second portion 40 forming a new second portion 140, with the anchoring means having a pointed end to engage the operational surface and an engaging element to engage and disengage the pointed end with the operational surface. Looking at FIGS. 1a and 3a, preferably, the predetermined first portion anchoring means is a first foot bolt 141a added to the first portion 20 forming the first portion 120, and the predetermined second portion anchoring means is a second foot bolt 141b added to the second portion 20 of forming the second portion 140. The anchoring means, first foot bolt 141a and second foot bolt 141b, are used during slippery conditions to anchor the tool support 110 to the operational surface. The first cap 114a and the second cap 114b provide wearing surfaces, protecting the first edge 22 and the second edge 24, respectively. The second foot bolt 141b is equivalent to the first foot bolt 141a, shown in FIG. 4, and the second cap 114b is equivalent to the first cap 114a shown in FIG. 5a. Looking again at FIGS. 4, and 5d, the first foot bolt 141a has a pointed end 142a, a threaded end 143a, and an engaging element 144a. Likewise, looking at FIG. 5f, second foot bolt 141b has a pointed end 142b, a threaded end 143b, and an engaging element 144b. The first foot bolt threaded end 143a and the second foot bolt threaded end 143b are attached to the first foot bolt engaging element 144a and the second foot bolt engaging element 144b, respectively. Looking at FIG. 5a, the first cap 114a has an first cap outer surface 153a, a first cap inner surface 155a, and a first cap hole 147a. Likewise, looking at FIG. 3c, the second cap 114b has a second cap outer surface 153b, a second cap inner surface 155b, and a second cap hole 147b.

Figure 3C:
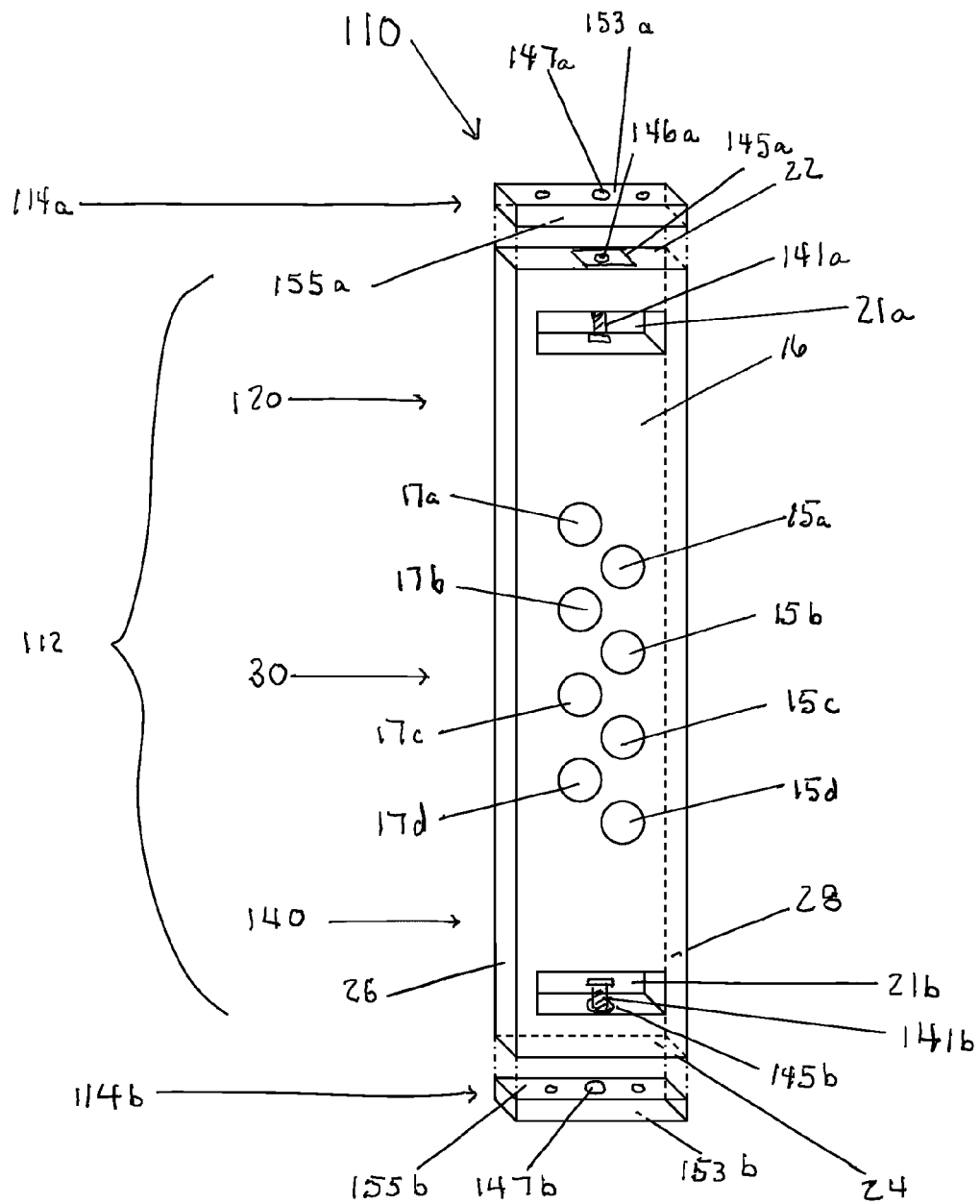
FIG. 3c shows the second embodiment of the invention from a perspective first side surface view showing the unattached first cap and second cap
Figure 5A:
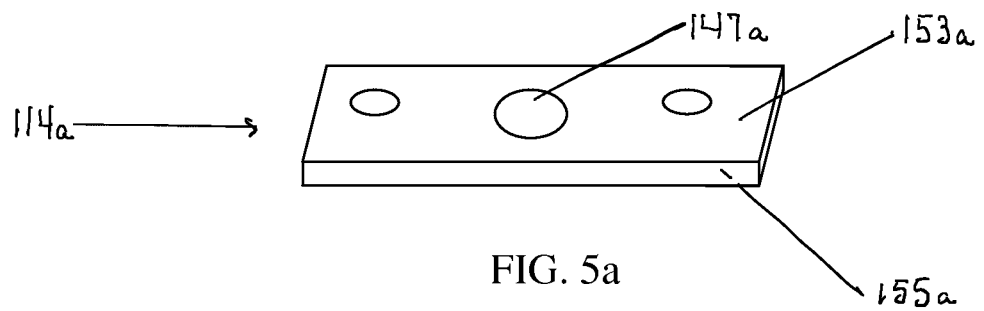
FIG. 5a shows a perspective view of the first cap of the second embodiment of the invention
Figure 5B:
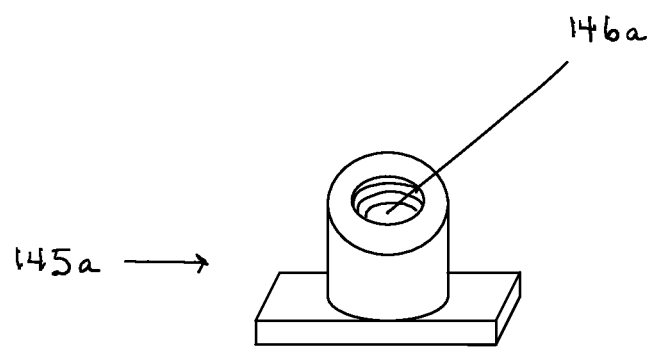
FIG. 5b shows is a perspective view of a first threaded element, a T-nut
Figure 5C:
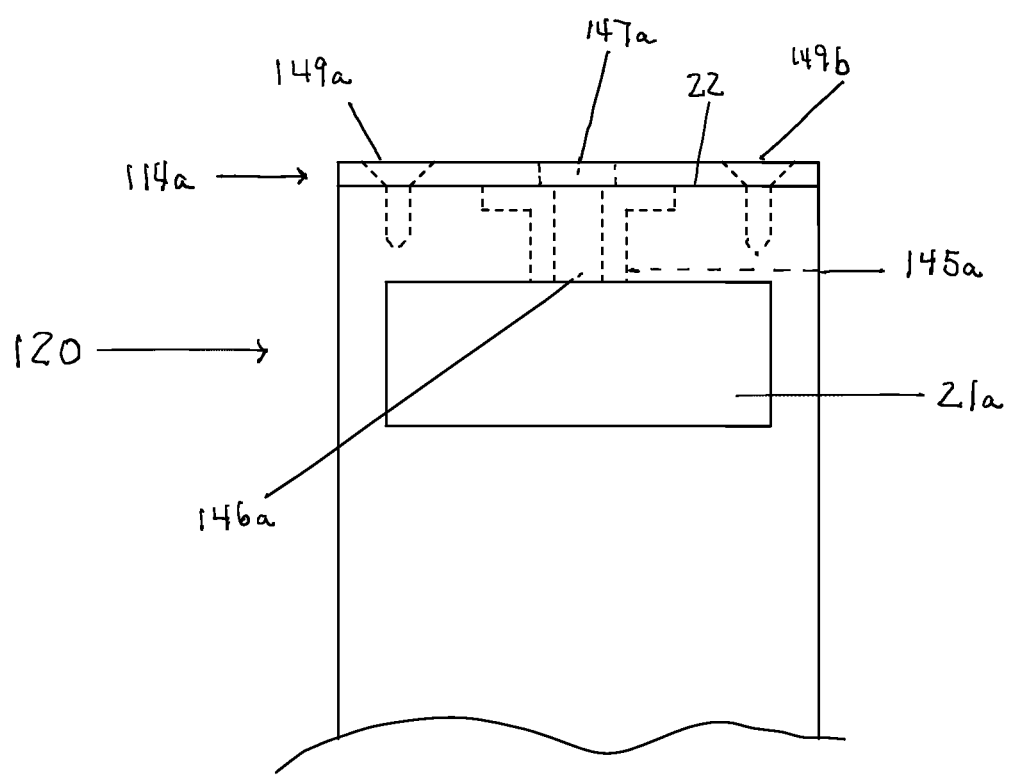
FIG. 5c shows the second embodiment of the invention from a first side surface view of the first portion of the main element with the first foot bolt removed

Looking a FIG. 3c, first portion 120 comprises the first access opening 21a, the first foot bolt 141a, and looking at FIGS. 5b and 5c, a first threaded element in 145a having a threaded first portion aperture 146a. The first foot bolt 141a is sized to screw into and out of the first portion aperture 146a of the first threaded element 145a, preferably a t-nut. Looking again at FIGS. 5c and 6a, the first portion aperture 146a runs from the first access opening 21a to the first edge 22. The first portion aperture 146a of the first threaded element 145a is sized for the first foot bolt 141a shown in FIG. 5d.

Figure 5D:
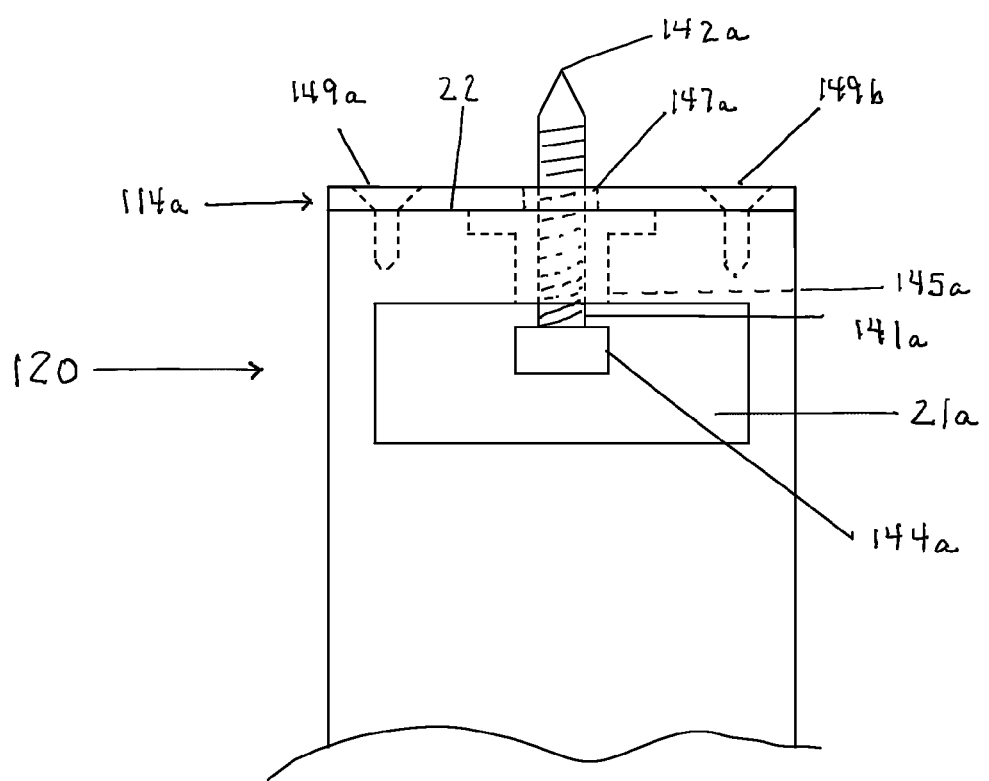
FIG. 5d shows the second embodiment of the invention from a first side surface view of the first portion of the main element with the first foot bolt extended
Figure 5E:
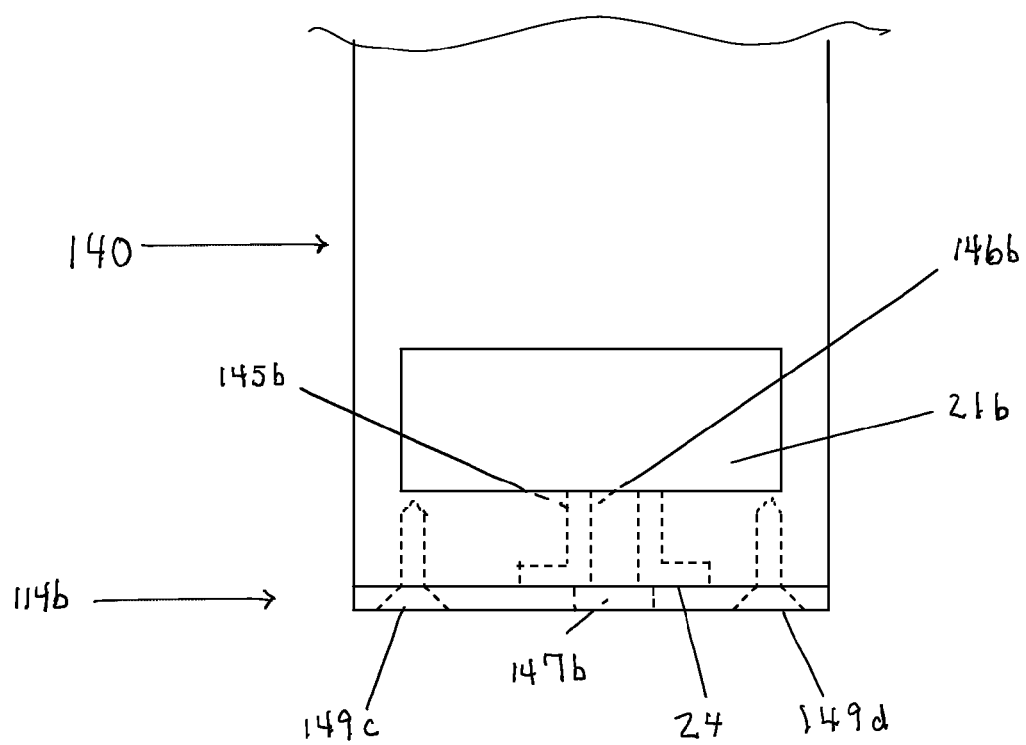
FIG. 5e shows the second embodiment of the invention from a first side surface view of the second portion of the main element with the second foot bolt removed
Figure 5F:
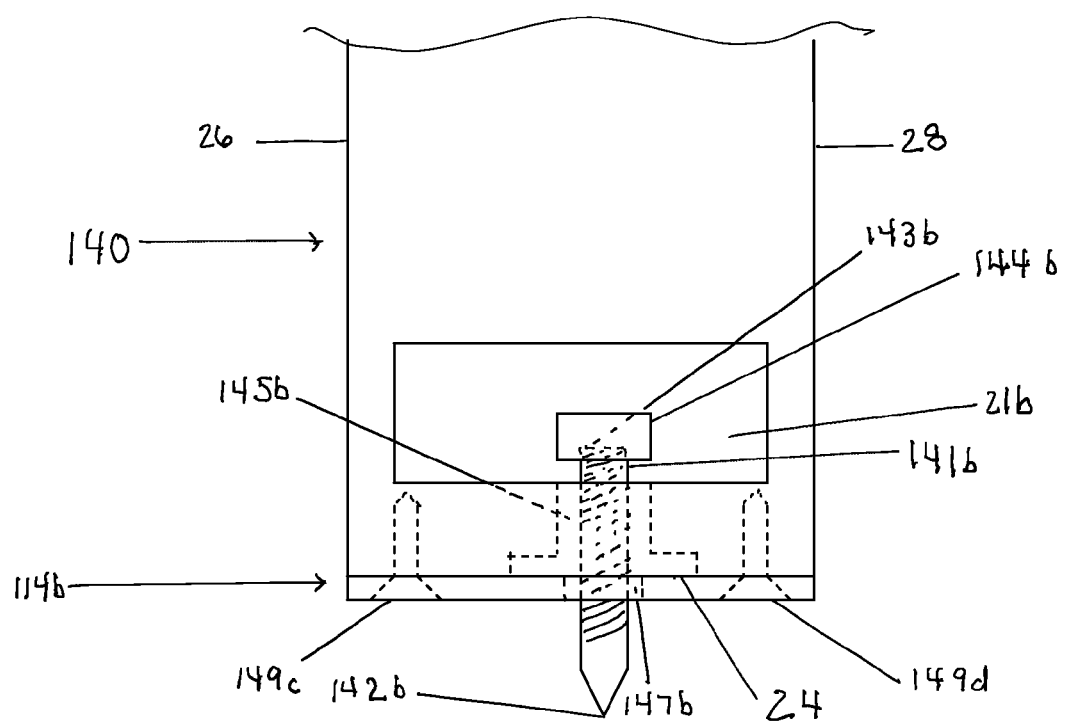
FIG. 5f shows the second embodiment of the invention from a first side surface view of the second portion of the main element with the second foot bolt extended

Looking at second portion 140 in FIG. 3a and more particularly in FIGS. 5e and 5f, second portion 140 comprises the second access opening 21b, the second foot bolt 141b, and a second threaded element 145b. The second threaded element 145b, preferably a T-nut, has a second portion aperture 146b that is threaded and sized for the second foot bolt 141b. Looking at FIG. 5e, the second portion aperture 146b is generally centered along the longitudinal axis of the second portion 140 of main element 112 running from the second access opening 21b to the second edge 24. Looking at FIGS. 5e, 5f, and 6b, threaded element 145b is mortised to make it flush with the second edge 24.

Figure 4:
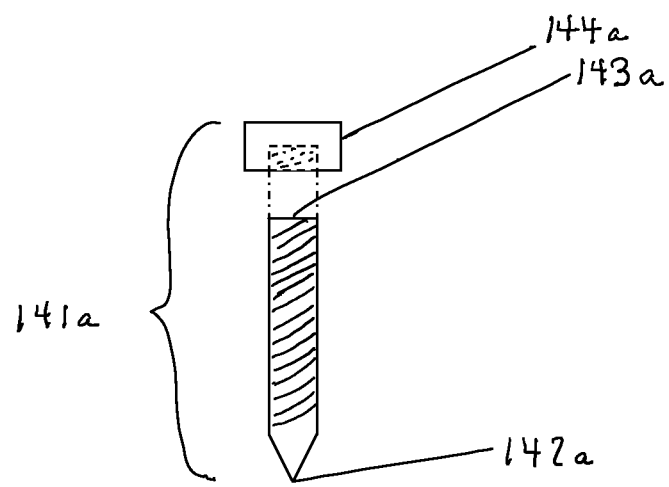
FIG. 4 shows a view of the first foot bolt used in the second embodiment of the invention
Figure 7A:
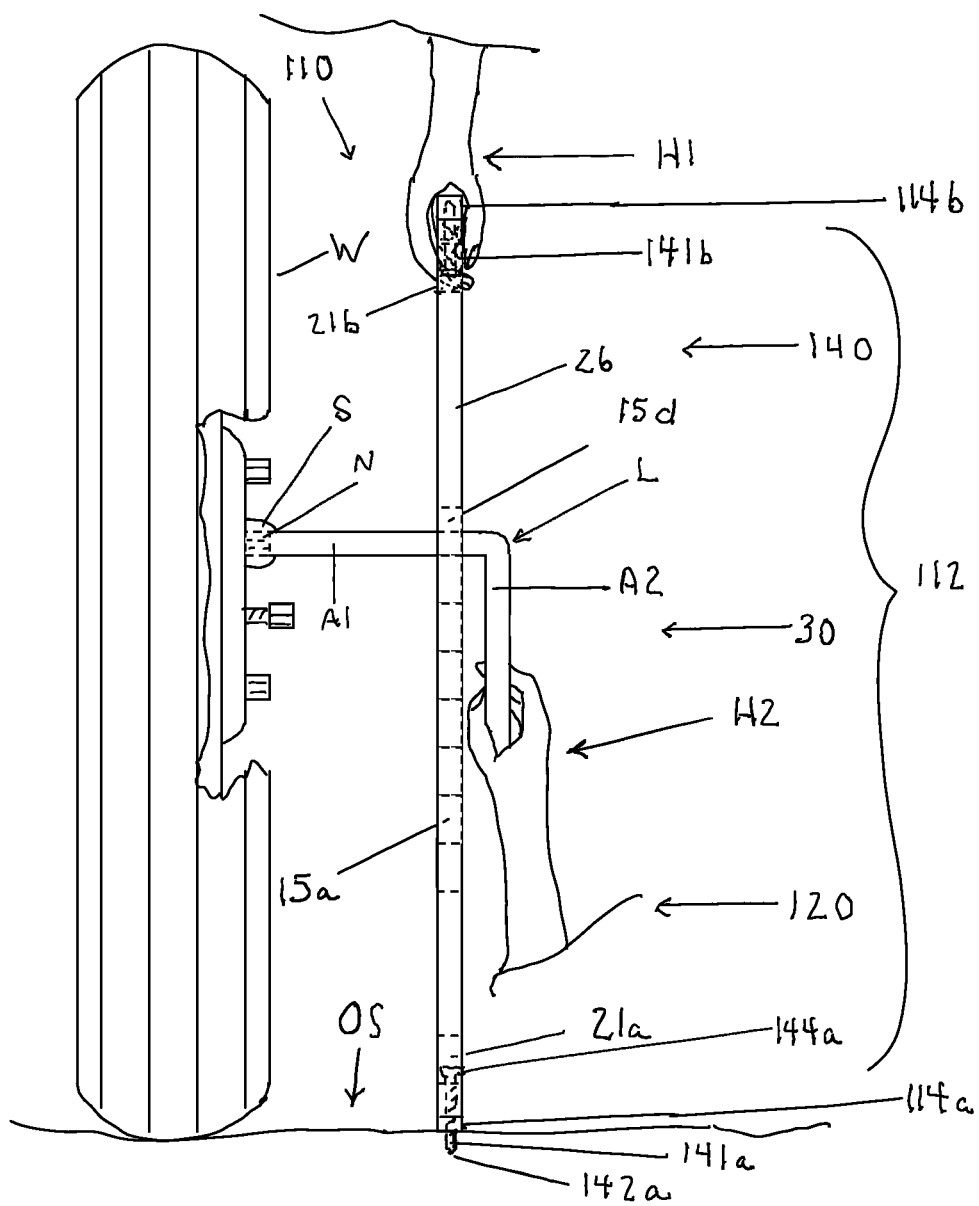
FIG. 7a shows the second embodiment of the invention from a third edge view with the first cap adjacent the operational surface with the first foot bolt extended

Looking at FIG. 7a, when the second access opening 21b is used as a hand grip, the first foot bolt 141a can be manipulated using the first foot bolt engaging element 144a, also shown in FIGS. 4 and 5d, to screw the first foot bolt 141a out of the first portion 120 so that the first foot bolt pointed end 142a engages the operational surface OS, reducing the likelihood of the tool support 110 sliding on slippery surfaces, such as ice. The first foot bolt engaging element 144a is also used to retract the first foot bolt 141a back into the first portion 120. Looking at FIGS. 3c and 5c, threaded element 145a is mortised to make it flush with the first edge 22. Looking at FIG. 7b, with the first access opening 21a used as a hand grip and the second end cap 114b adjacent to the operational surface OS, the second foot bolt 141b is manipulated using the second foot bolt engaging element 144b, shown more particularly in FIG. 5f, screwing the foot bolt 141b out of second portion 140, so that the second foot bolt pointed end 142b contacts the operational surface OS, reducing the likelihood of the tool support 110 sliding on slippery surfaces, such as ice. The second foot bolt engaging element 144b is also used to retract the first foot bolt 141b back into the second portion 140.

Figure 6A:
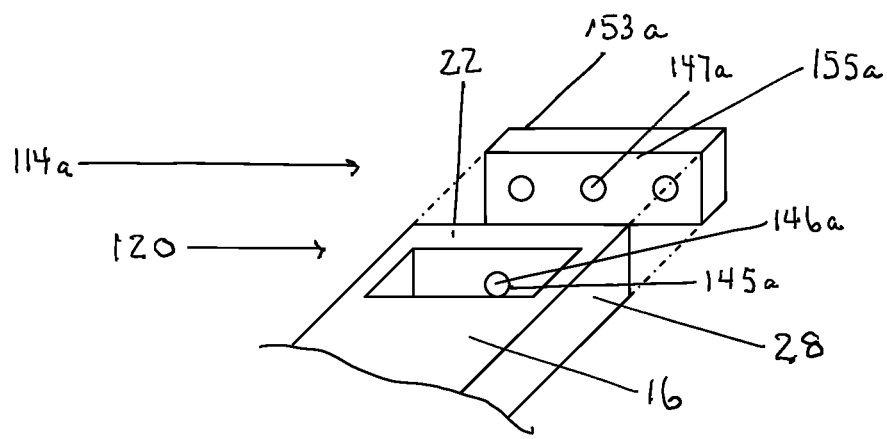
FIG. 6a shows the second embodiment of the invention from a perspective view looking up from the first portion of the main element with the first cap of the tool support unattached and with attaching screws and the first foot bolt removed

Looking at FIGS. 3c, 5a, and 6a, the first cap 114a has a first cap hole 147a, a first cap outer surface 153a and a first cap inner surface 155a. Looking at FIG. 3c, the first cap hole 147a is centered on the longitudinal axis of first portion 120 of the main element 112, providing an opening from the first cap outer surface 153a to the first cap inner surface 155a. The first cap hole 147a is sized to allow the foot bolt 141a to pass through the first cap hole 147a. Looking at FIGS. 3c and 6a, the first cap inner surface 155a is aligned with and adjacent to the first edge 22 of the first portion 20 of the main element 112. The first cap hole 147a is unthreaded. Looking again at FIGS. 3a and 5d, the first cap 114a is attached to the first portion 120 of main element 112 using a first predetermined attachment means, such as a first screw 149a and a second screw 149b, and the first cap 114a also holds the threaded element 145a in position as shown in FIG. 5d.

Figure 6B:
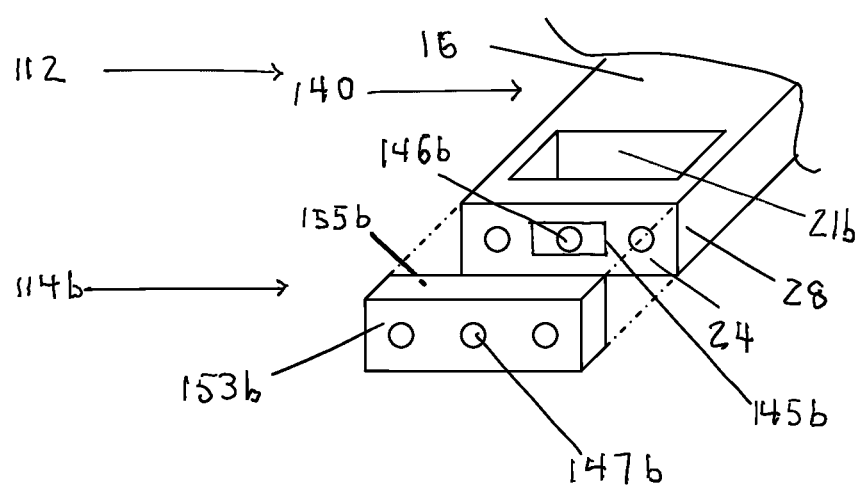
FIG. 6b shows the second embodiment of the invention from a perspective view looking up from the second cap of the tool support to the second portion of the main element with the attaching screws and the second foot bolt removed

Looking at FIGS. 3c, 5e, and FIG. 6b, the second cap 114b has a second cap hole 147b, a second cap outer surface 153b, and a second cap inner surface 155b. The second cap hole 147b is centered on the longitudinal axis of second portion 140 of the main element 112, providing an opening from the second cap outer surface 153b to the second cap inner surface 155b. Looking at FIG. 5f, the second cap hole 147b is sized to allow the foot bolt 141b to pass through the second cap 114b. Looking at FIGS. 3c and 5f, the second cap outer surface 153a is aligned with and adjacent to second edge 24 of second portion 140. The second cap hole 147b is unthreaded. The second cap 114b is attached to the second portion 140 using a second predetermined attachment means, such as third screw 149c and fourth screw 149d, and second cap 114b also holds the threaded element 145b in position.

The first cap 114a and second cap 114b have a predetermined cap configuration that is preferably a rectangular cuboid with both the first cap 114a and the second cap 114b having the having the same dimensions and being made of the same material. Generally, the first cap 114a and the second cap 114b have a thickness, as measured on a line perpendicular to second cap outer surface 153b running to second cap inner surface 155b, between 1/16 inch and 1/2 inch, preferably 1/8 inch, and are made of predetermined cap material, carbon or stainless steel, preferably stainless steel. The predetermined anchoring means configuration for the first foot bolts 141a and the second foot bolt 141b is a length long enough to extend 0.5 to 1.5 inches, preferably 1 inch, out of the top cap 114a and the bottom cap 114b, respectively, to engage the operational surface OS shown in FIGS. 7a and 7b, respectively; between 1/8 inch and 1/2 inch in diameter, preferably 1/4 inch in diameter; and a predetermined anchoring means material composition that may be carbon or stainless steel, preferably stainless steel.

Figure 7B:
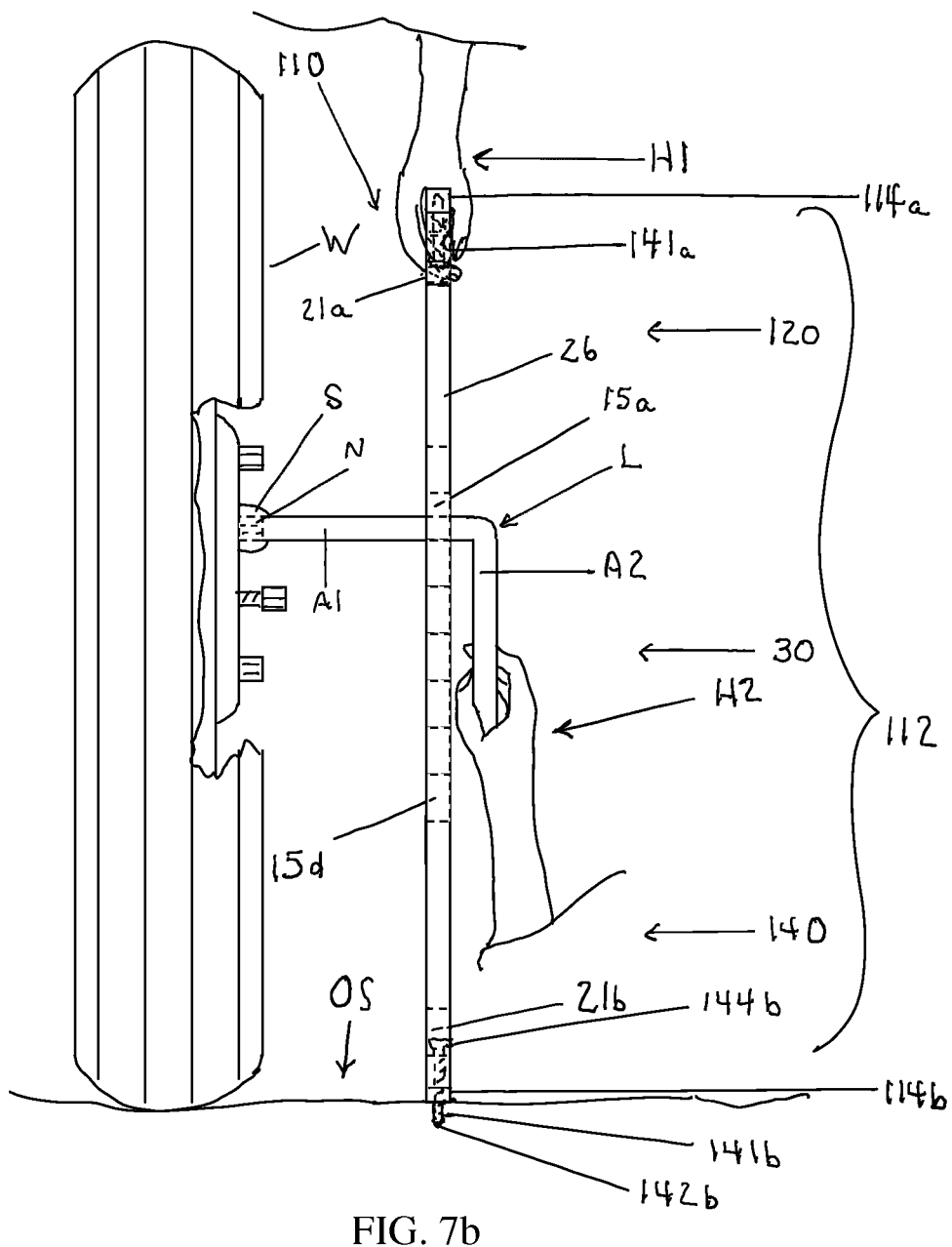
FIG. 7b shows the second embodiment of the invention from the third edge view with the second cap adjacent the operational surface with the second foot bolt extended

Looking at FIGS. 7a and 7b, when the first foot bolt 141a and the second foot bolt 141b are present in the first portion 120 and the second portion 140, respectively, the first and second access openings, 21a and 21b, respectively, are also sized to allow the foot bolts, such as the first foot bolt 141a, to be manipulated to contact the operational surface OS as shown in FIG. 7a, and retracted back into the tool support 10 as shown in FIG. 7b.

Figure 8A:
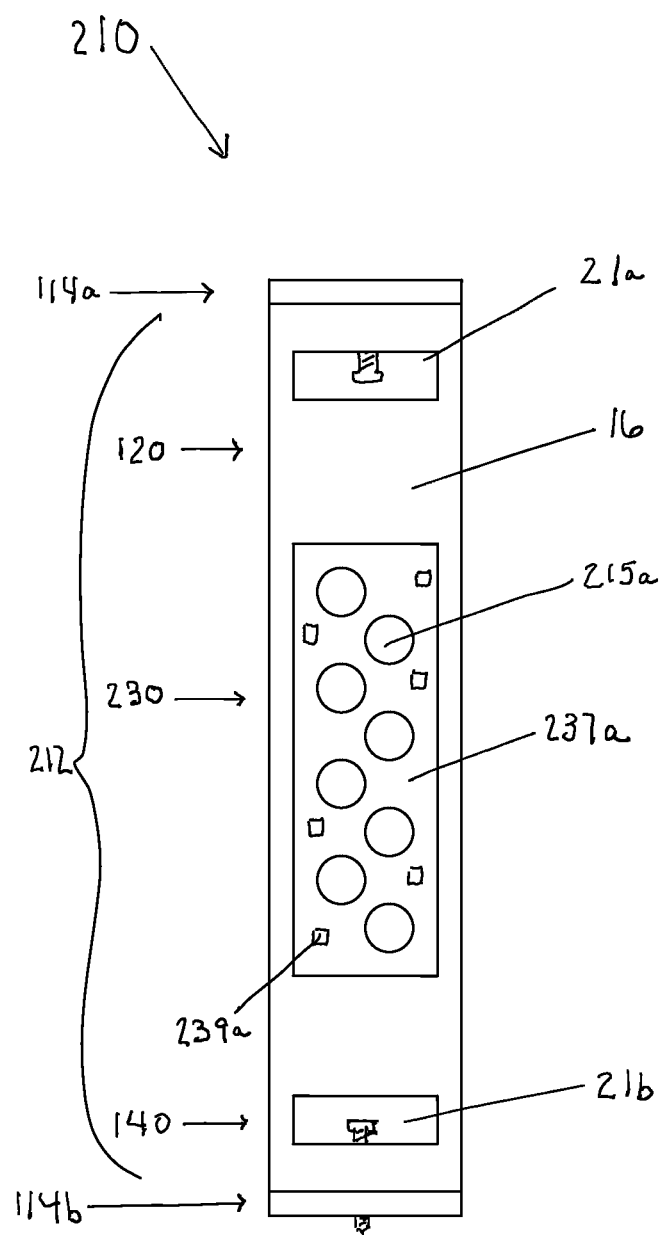
FIG. 8a shows a third embodiment of the invention with a support first plate on the first side surface
Figure 8B:
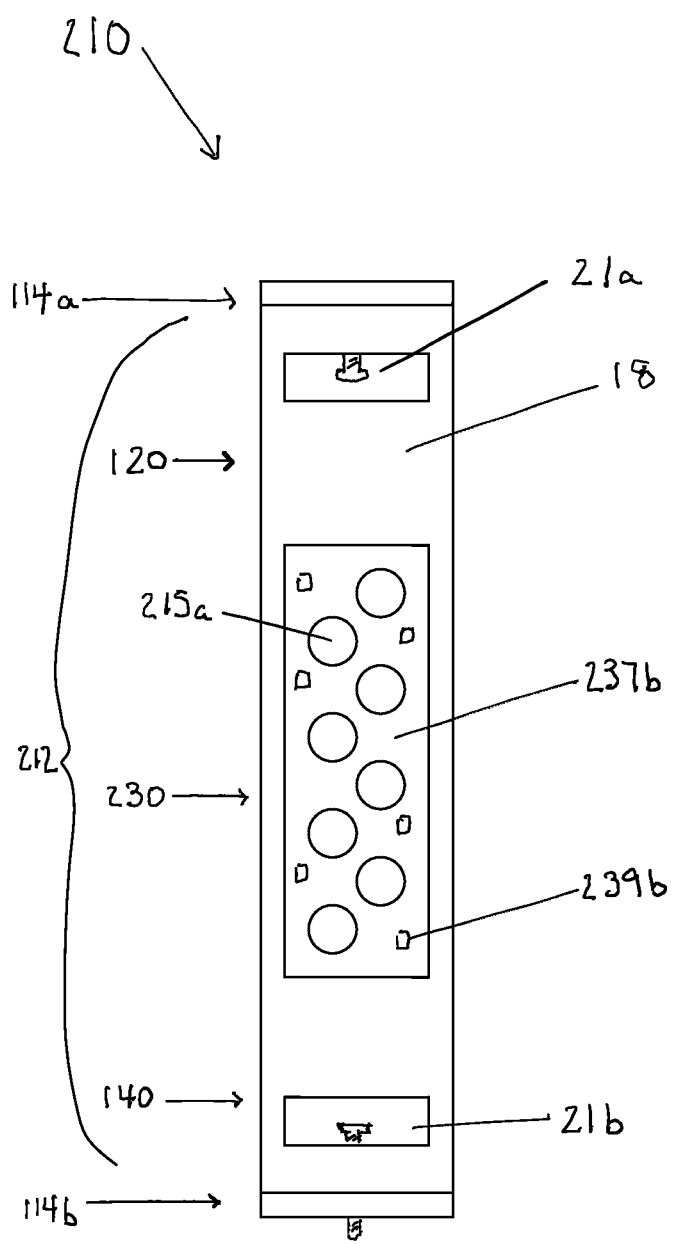
FIG. 8b shows the third embodiment of the invention with a support second plate on the second side surface

In a third embodiment of the invention 210, shown in FIGS. 8a and 8b, a main element 212 is formed by adding a support first plate 237a and a support second plate 237b to the first side surface 16 and the second side surface 18, respectively, of mid portion 30 of main element 112 of the second embodiment of the invention 110 shown in FIGS. 3a and 3b. The result is a mid portion 230 of the main element 212 shown in FIGS. 8a and 8b. The first portion 120 and the second portion 140 remain unchanged from the main element 112 of the second embodiment of the invention 110 shown in FIGS. 3a and 3b. The first plates 237a and the second plate 237b are generally rectangular plates with each having a plurality of apertures aligned with the plurality of cylindrical through openings, such as cylindrical through opening 15a, of the main element 112 of the second embodiment of the invention 110 shown in FIGS. 3a and 3b, forming a new plurality of cylindrical through openings, such as cylindrical through opening 215a. The first plate 237a and second plate 237b provide added strength to the mid portion 212 and wearing surfaces around the plurality of cylindrical through openings, such cylindrical through opening 215a. The first plate 237a and the second plate 237b are beneficial where heavy usage is expected. The first plate 237a and the second plate 237b are attached to the first side surface 16 and the second side surface 18, respectively, with plurality of fasteners, such as first fastener 239a shown in FIG. 8a, that are operationally connected to a plurality of fasteners, such as second fastener 239b shown in FIG. 8b. The first fastener 239a and second fastener 239b can be a bolt and a nut, a first end and a second end of a rivet, or a bolt and T-nut, respectively, preferably a bolt and T-nut.

Figure 9A:
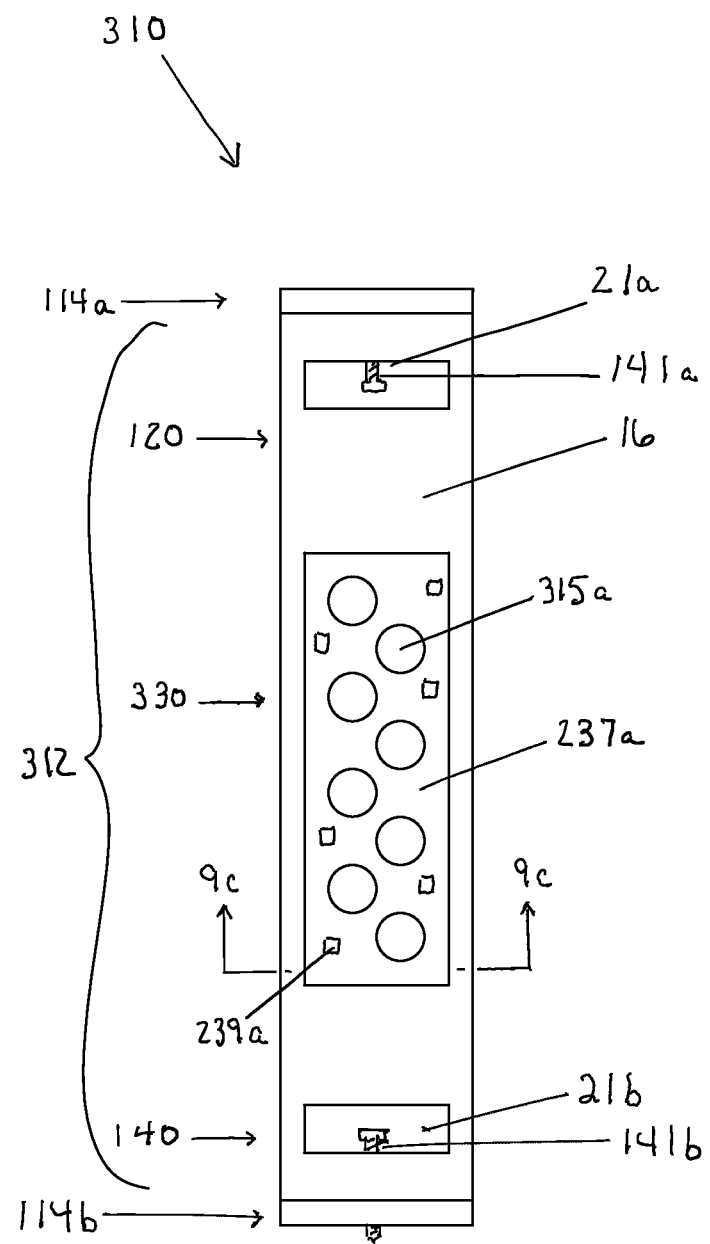
FIG. 9a shows a fourth embodiment of the invention with the support first plate in a mortise
Figure 9B:
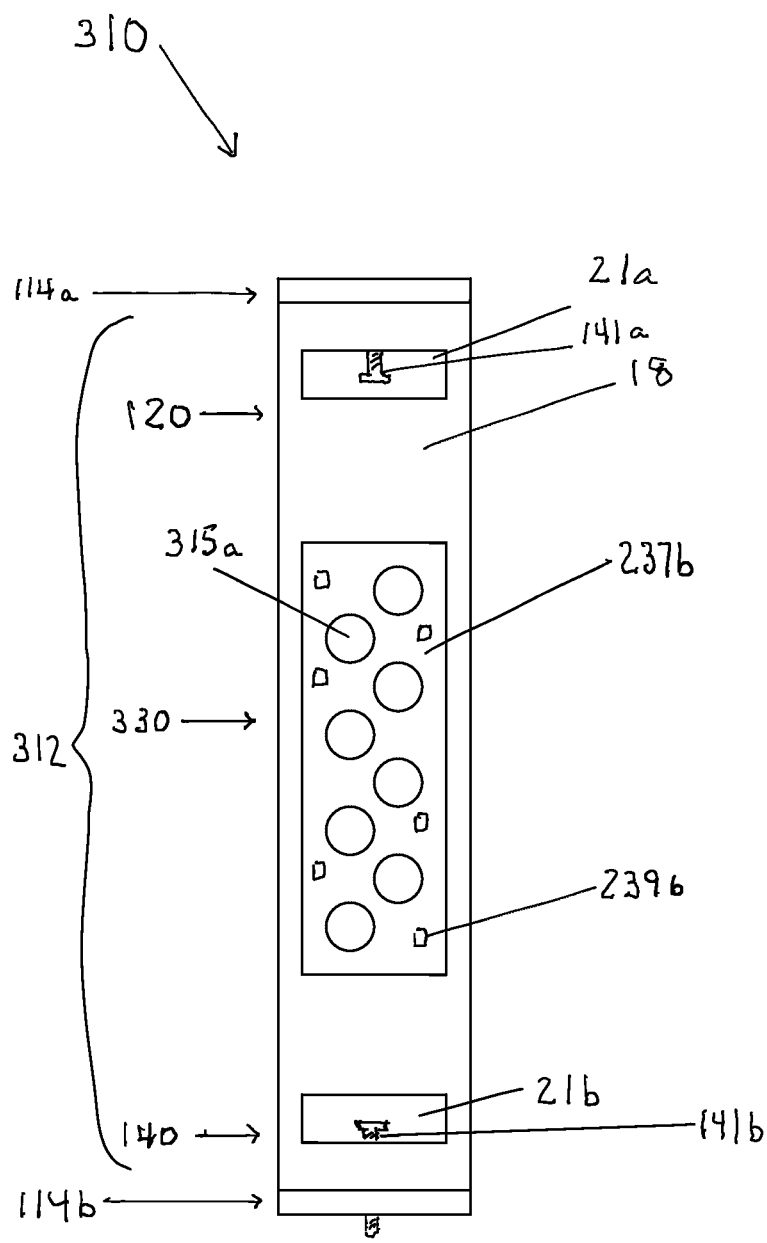
FIG. 9b shows the fourth embodiment of invention with the support second plate in a mortise
Figure 9C:
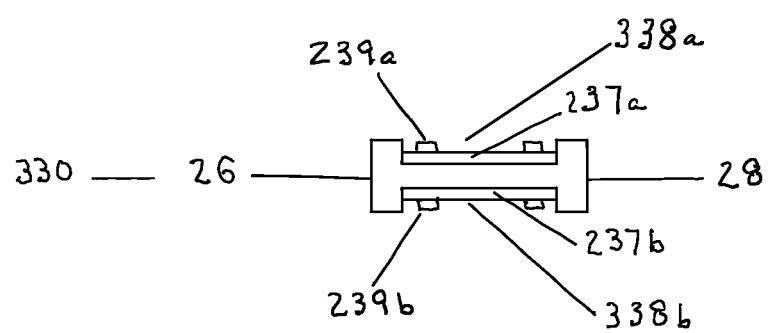
FIG. 9c shows the fourth embodiment of invention from a sectional view along line 9c-9c in FIG. 9a with the support first and second plates of the mid portion in a first mortise and a second mortise, respectively.

In a fourth embodiment of the invention 310, shown in FIGS. 9a, 9b, and 9c, a new mid portion 330 is formed by placing the first plate 237a and the second plate 237b of the mid portion 230 of the main element 212 of the third embodiment of the invention 210 shown in FIGS. 8a and 8b, respectively, in a first mortise 338a and a second mortise 338b shown a FIG. 9c, a sectional view of the mid portion 330 of the main element 312 along line 9c-9c of FIG. 9a. Main element 312 has the same first portion 120 and the same second portion 130 as main element 212 in FIGS. 8a and 8b, but with the different mid portion 330. The mid portion 330 has a plurality of cylindrical through openings, such as cylindrical through opening 315a, having the same diameter and spacing as the plurality of cylindrical through openings, such as cylindrical through opening 215a, of the third embodiment of the invention 210 shown in FIGS. 8a and 8b, but with each cylindrical through opening, such as cylindrical through opening 315a, having a depth reduced by the depth of the first mortise 328a and the second mortise 328b shown in FIG. 9c. The first plate 237a and the second plate 237b are held in the mortises 338a and 338b, respectively, by a plurality of fasteners, such as the first fastener 239a, operationally connected to a plurality of fasteners, such as the second fastener 239b. The first mortise 338a and the second mortise 338b are sized for plates 237a and 237b, respectively, and deep enough to prevent the plurality of fasteners, such as first fastener 239a, and the plurality of fasteners, such as fastener 239b from breaking the planes of first side surface 16 and second side surface 18, respectively.

Looking at FIGS. 8a, 8b, 9a, and 9b, first plate 237a and second plate 237b are sized to provide a plate that runs from a line parallel to third edge 26 and ⅛ inch inside of from third edge 26 to a line parallel to fourth edge 28 and ⅛ inch inside of fourth edge 28 and running the length of the mid portions 230 and 330. The first plate 237a and the second plate 237b are 1/16 to ⅜ of an inch thick, preferably 1/16 of an inch thick and made of carbon or stainless steel, preferably carbon steel.

The main element 12 of the invention 10 has a predetermined main element configuration that is a rectangular cuboid. The height of main element 12, as measured along its longitudinal axis from the first edge 22 to the second edge 24, is 5 to 8 times its width, as measured on a line perpendicular to the longitudinal axis from the third edge 26 to the fourth edge 28, preferably the height is 6 times the width. Looking again at FIG. 2a, main element 12 is made of a predetermined main element material that will provide sufficient strength to support the lug nut tool L when the lug nut tool L is rotating the lug nut N, the predetermined main element material that can be a wood, a plastic, a composite material, a carbon fiber, or a steel, but preferably a wood, such as oak. Main element 12 has a thickness as measured on a line generally perpendicular to first side surface 16 and second side surface 18 dependant on the material used, but generally 0.5 to 2 inches for wood materials, preferably 0.75 inches for oak; and at least 0.25 to 0.5 inches for steel products, preferably 0.25 inches; and 0.25 to 1 inches for composite materials and plastic materials, preferably 0.75 inches.

The mid portion 30 of main element 12 of the first embodiment of the invention 10, the mid portion 130 of main element 112 of the second embodiment of the invention 110, the mid portion 230 of main element 212 of the third embodiment of the invention 210, and mid portion 330 of main element 312 the fourth embodiment of the invention 310 each have the same height as measured along their longitudinal axis and the same width as measured traverse to the longitudinal axis from first side edge 26 to second side edge 28.

Figure 5G:
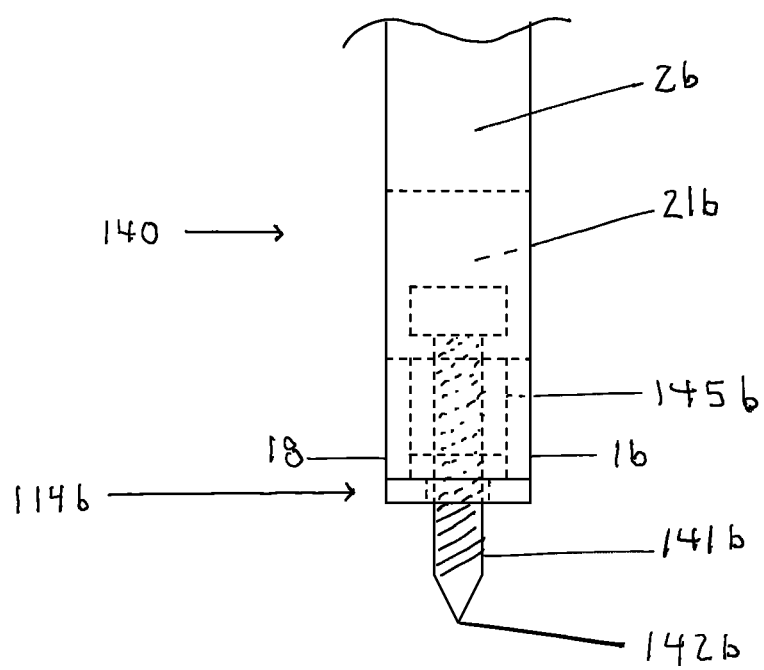
FIG. 5g shows the second embodiment of the invention from a view of the third edge of the second portion of the main element with the second foot bolt extended

The main element 112 of the second embodiment of the invention 110 shown in FIGS. 8a and 8b has the same height and width as main element 12 of the first embodiment of the invention 10 shown in FIGS. 1a and 1b, and can be made of the same materials. Looking at the second portion 140 in FIGS. 3a, 3e and 5g, the thickness of the main element 112 must be sufficient to provide for the placement of the threaded elements, such as 145b, in second portion 140 shown in FIG. 5g. For wood, composite, carbon fiber and plastic materials, the thickness allows at least 3/16 inch clearance from the threaded elements, such as 145b, to each of first side surface 16 and second side surface 18. For example, for the threaded element 145b in FIG. 5g, having an outside diameter of ⅜ inches, as measured from first side surface 16 to second side surface 18, the thickness of main element 112 of tool support 110 is not less than 0.75 inches. For steel materials, the thickness should be not less than the outside diameter of the threaded elements, such as threaded element 145b.

The main element 212 of the third embodiment of the invention 210 shown in FIGS. 8a and 8b without the first plate 237a and the second plate 237b attached to mid portion 230, and the main element 312 of the fourth embodiment of the invention 310 shown in FIGS. 9a and 9b before mortises 238a and 238b are cut in mid portion 330 as shown in FIG. 9c, are rectangular cuboids, having the same dimensions and being made of the same materials as main element 112 of the second embodiment of the invention 110 shown in FIGS. 1a and 1b.

Although the present invention has been described in considerable detail with reference to preferred versions thereof, other versions are possible. Therefore, the spirit and scope of the appended claims should not be limited to the description of the preferred versions contained herein. Various deviations and modification may be made within the spirit and scope of this invention without departing from the main theme thereof.

What is claimed is:

1. I claim for use in removing and replacing a vehicle wheel secured to the vehicle by a plurality of spaced lug nuts, when using a lug nut tool having a socket on one end of an extended arm, such a rigid "L" shaped lug nut tool with one arm carrying a socket compatible to the lug nuts, or when using a 4 way lug nut tool having four radially extending arms, each lug nut tool having at least one arm carrying a socket compatible with the lug nuts, a lug nut tool support comprising: an elongated main element, said main element having a first portion, a mid portion, and a second portion;

said mid portion located between the first portion and the second portion;

said main element having a first edge, a second edge, a third edge, a fourth edge, a first side surface, and a second side surface;

said mid portion having a plurality of cylindrical though openings;

said main element being in a generally vertical position when the tool support is in an operational state on an operational surface with the plurality of cylindrical through openings facing the wheel having the lug nuts to be removed;

said cylindrical through openings being generally horizontal when the tool support is in the operational state with the tool support vertically oriented;

said each cylindrical through opening of the mid portion being at a different height relative to the operational surface than the any other cylindrical through opening of the mid portion when the tool support is in the operational state vertically positioned with the plurality of cylindrical through openings facing the wheel;

said cylindrical through openings sized to allow any socket of the lug nut tool to pass through the cylindrical through openings;

said cylindrical through openings sized for the aligning of the arm of the lug nut tool having the lug nut socket compatible with the lug nut being rotated;

said cylindrical through openings providing a support means to support the lug nut tool when rotating the lug nut on which the socket of the lug nut tool is placed;

said first portion having a height, as measured along the longitudinal axis of the main element from the first edge to the mid portion, varying by a predetermined incremental value from a second portion height, as measured along the longitudinal axis of the main element from the mid portion to the second edge;

said plurality of cylindrical through openings providing a first set of cylindrical through opening heights, when measured as the distance from the operational surface vertically to the nearest point on each cylindrical through opening, when the plurality of cylindrical through openings is facing the wheel and the second portion is adjacent to the operational surface;

said plurality of cylindrical through openings providing a second set of cylindrical through opening heights when measured as the distance from the operational surface vertically to the nearest point on each cylindrical through opening when the tool support is inverted and the plurality of cylindrical through openings is facing the wheel and the first portion is adjacent to the operational surface.

2. The lug nut tool support in claim 1 where in the plurality of cylindrical through openings of the mid portion is in a predetermined cylindrical through opening configuration.

3. The lug nut tool support in claim 1 wherein the main element is of a predetermined main element configuration and the main element is of a material providing sufficient strength to support the lug nut tool when the lug nut tool is rotating the lug nut.

4. The lug nut tool support in claim 1 wherein the first portion further comprises:
a first access opening;
said first access opening comprising an elongated through opening from the first side surface to the second side surface of the first portion of the main element;
said first access opening used as a hand grip;
said first access opening sized and located in the first portion to allow an individual's hand to hold the tool support in the vertical position with the cylindrical through openings of the mid portion confronting the wheel.

5. The lug nut tool support in claim 1 wherein the second portion further comprises:
a second access opening;
said second access opening comprising an elongated through opening from the first side surface to the second side surface of the second portion of the main element;
said second access opening used as a hand grip;
said second access opening sized and located in the second portion to allow an individual's hand to hold the tool support in the vertical position with the cylindrical through openings of the mid portion confronting the wheel.

6. I claim for use in removing and replacing a vehicle wheel secured to the vehicle by a plurality of spaced lug nuts, when using a lug nut tool having a socket on one end of an extended arm, such a rigid "L" shaped lug nut tool with one arm carrying a socket compatible to the lug nuts, or when using a standard 4 way lug nut tool having four radially extending arms, each lug nut tool having at least one arm carrying a socket compatible with the lug nuts, a lug nut tool support comprising: an elongated main element, a first cap, and a second cap;
said main element having a first portion, a mid portion, and a second portion;
said mid portion located between the first portion and the second portion;
said first portion located between the first cap and the mid portion;
said first portion having a predetermined first portion anchoring means;
said second portion located between the second cap and the mid portion;
said second portion having a predetermined second portion anchoring means;
said main element having a first edge, a second edge, a third edge, a fourth edge, a first side surface, and a second side surface;
said mid portion having a plurality of cylindrical through openings;
said main element being in a generally vertical position when the tool support is in an operational state on an operational surface with the plurality of cylindrical through openings facing the wheel having the lug nuts to be removed;
said cylindrical through openings being generally horizontal when the tool support is in the operational state with the tool support vertically oriented;
said each cylindrical through opening of the mid portion being at a different height relative to the operational surface than the any other cylindrical through opening of the mid portion when the tool support is in the operational state vertically positioned with the plurality of cylindrical through openings facing the wheel;
said cylindrical through openings sized to allow any socket of the lug nut tool to pass through the cylindrical through openings;
said cylindrical through openings sized for the aligning of the arm of the lug nut tool having the lug nut socket compatible with the lug nut being rotated;
said cylindrical through openings providing a means to support the lug nut tool when rotating the lug nut on which the socket of the lug nut tool is placed;
said first portion having a height, as measured along the longitudinal axis of the main element from the first edge to the mid portion, varying by a predetermined incremental value from a second portion height, as measured along the longitudinal axis of the main element from the mid portion to the second edge;
said plurality of cylindrical through openings providing a first set of cylindrical through opening heights, when measured as the distance from the operational surface vertically to the nearest point on each cylindrical through opening, when the plurality of cylindrical through openings is facing the wheel and the second cap of the tool support is adjacent to the operational surface;
said plurality of cylindrical through openings providing a second set of cylindrical through opening heights when measured as the distance from the operational surface vertically to the nearest point on each cylindrical through opening when the tool support is inverted and the plurality of cylindrical through openings is facing the wheel and the first cap of the tool support is adjacent to the operational surface.

7. The lug nut tool support in claim 6 wherein the plurality of cylindrical through openings of the mid portion is in a predetermined cylindrical through opening configuration.

8. The lug nut tool support in claim 6 wherein the main element is of predetermined main element configuration and the main element is of a material providing sufficient strength to support the lug nut tool when the lug nut tool is rotating the lug nut.

9. The lug nut tool support in claim 6 wherein the first portion further comprises:
a first access opening;
said first access opening comprising an elongated through opening from the first side surface to the second side surface of the first portion of the main element;
said first access opening used as a hand grip;

said first access opening sized and located in the first portion to allow an individual's hand to hold the tool support in the vertical position with the cylindrical through openings of the mid portion confronting the wheel.

10. The lug nut tool support in claim 6 wherein the first portion anchoring means further comprises:
a pointed end to engage the operational surface and an engaging element to engage and disengage the pointed end with the operational surface;
said first portion anchoring means located on the longitudinal axis of the main element;
said first portion anchoring means engaging the operational surface on which the tool support is placed when said tool support is an operational state with the first end cap adjacent to the operational surface reducing the likelihood of said tool support slipping on icy or other slippery surfaces.

11. The lug nut tool support in claim 6 wherein the second portion further comprises:
a second access opening;
said second access opening comprising an elongated through opening from the first side surface to the second side surface of the second portion of the main element;
said second access opening used as a hand grip;
said second access opening sized and located in the second portion to allow an individual's hand to hold the tool support in the vertical position with the cylindrical through openings of the mid portion confronting the wheel.

12. The lug nut tool support in claim 6 wherein the second portion anchoring means further comprises:
a pointed end to engage the operational surface and an engaging element to engage and disengage the pointed end with the operational surface;
said second portion anchoring means located on the longitudinal axis of the main element;
said second portion anchoring means engaging the operational surface on which the tool support is placed when said tool support is an operational state with the second end cap adjacent to the operational surface reducing the likelihood of said tool support slipping on icy or other slippery surfaces.

13. The lug nut tool support in claim 6 wherein said first cap further comprises:
a first cap outer surface and a first cap inner surface;
said first cap inner surface is adjacent to and aligned with the first edge of the main element and attached to the main element by a first predetermined attachment means;
said first cap outer surface providing a wearing surface protecting the first edge of the main element when the tool support first cap outer surface is adjacent to the operational surface;
said first cap configured to allow the first portion anchoring means to engage the operational surface;
said first cap being of a predetermined cap configuration.

14. The lug nut tool support in claim 6 wherein said second cap further comprises:
a second cap outer surface and a second cap inner surface;
said second cap inner surface is adjacent to and aligned with the second edge of the main element and attached to the main element by a second predetermined attachment means;
said second cap outer surface providing a wearing surface protecting the second edge of the main element when the tool support second cap outer surface is adjacent to the operational surface;
said second cap configured to allow the second portion anchoring means to engage the operational surface;
said second cap being of a predetermined cap configuration.

\* \* \* \* \*